United States Patent
Cooper et al.

(10) Patent No.: US 8,036,262 B2
(45) Date of Patent: Oct. 11, 2011

(54) ROBUST MODE STAGGERCASTING STORING CONTENT

(75) Inventors: Jeffrey Allen Cooper, Rocky Hill, NJ (US); Jill MacDonald Boyce, Manalapan, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1506 days.

(21) Appl. No.: 10/543,045

(22) PCT Filed: Jan. 26, 2004

(86) PCT No.: PCT/US2004/002062
§ 371 (c)(1),
(2), (4) Date: Jul. 21, 2005

(87) PCT Pub. No.: WO2004/066706
PCT Pub. Date: Aug. 12, 2004

(65) Prior Publication Data
US 2006/0050781 A1    Mar. 9, 2006

Related U.S. Application Data

(60) Provisional application No. 60/443,672, filed on Jan. 28, 2003.

(51) Int. Cl.
*H04N 7/12* (2006.01)
(52) U.S. Cl. .................................. 375/240.01
(58) Field of Classification Search ............... 375/240.1
See application file for complete search history.

(56) References Cited

U.S. PATENT DOCUMENTS

| | | | |
|---|---|---|---|
| 4,870,497 A | | 9/1989 | Chamzas et al. |
| 5,371,551 A | * | 12/1994 | Logan et al. .................. 348/571 |
| 5,446,759 A | | 8/1995 | Campana, Jr. |
| 5,477,263 A | | 12/1995 | O'Callaghan et al. |
| 5,532,748 A | | 7/1996 | Naimpally |
| 5,592,471 A | | 1/1997 | Briskman |
| 5,703,877 A | | 12/1997 | Nuber et al. |
| 5,822,324 A | | 10/1998 | Kostresti et al. |

(Continued)

FOREIGN PATENT DOCUMENTS

CA    1065409    10/1979

(Continued)

OTHER PUBLICATIONS

Search Report Dated Dec. 8, 2004.

(Continued)

*Primary Examiner* — David Czekaj
*Assistant Examiner* — Anner Holder
(74) *Attorney, Agent, or Firm* — Robert D. Shedd; Joseph J. Opalasch

(57) ABSTRACT

A method and apparatus for storing staggercasted content includes encoding a set of signals representing content. The set of signals is capable of being decoded to produce a corresponding set of decoded signals, each decoded signal having a quality different from the qualities of the decoded signals corresponding to the other encoded signals. A composite signal comprising the set of encoded signals, staggered in time, is generated. The set of encoded signals is extracted from the composite signal. Errors in the set of extracted encoded signals are detected to produce a subset of available extracted encoded signals which are not erroneous. A content representative signal at a selectable desired quality is decoded. The decoded content representative signal is then stored in a storage device.

21 Claims, 10 Drawing Sheets

Transmitter

U.S. PATENT DOCUMENTS

| | | | |
|---|---|---|---|
| 5,835,483 A | 11/1998 | Bisson | |
| 6,038,257 A | 3/2000 | Brusewitz et al. | |
| 6,144,400 A | 11/2000 | Ebisawa | |
| 6,148,005 A | 11/2000 | Paul et al. | |
| 6,195,024 B1 | 2/2001 | Fallon | |
| 6,211,926 B1 | 4/2001 | Won | |
| 6,304,609 B1 | 10/2001 | Stephens et al. | |
| 6,370,666 B1 | 4/2002 | Lou et al. | |
| 6,414,725 B1 | 7/2002 | Clarin et al. | |
| 6,418,549 B1 | 7/2002 | Ramchandran et al. | |
| 6,442,622 B1 | 8/2002 | Yamamoto et al. | |
| 6,480,541 B1 | 11/2002 | Girod et al. | |
| 6,535,717 B1 * | 3/2003 | Matsushima et al. | 455/18 |
| 6,646,578 B1 | 11/2003 | Au | |
| 6,687,305 B1 * | 2/2004 | Nakamura et al. | 375/240.26 |
| 6,700,624 B2 * | 3/2004 | Yun | 348/555 |
| 6,701,528 B1 | 3/2004 | Arsenault et al. | |
| 6,711,657 B1 | 3/2004 | Sexton et al. | |
| 6,771,657 B1 | 8/2004 | Elstermann | |
| 6,900,828 B2 | 5/2005 | Rasaswamy et al. | |
| 6,901,109 B2 | 5/2005 | Hanamura et al. | |
| 6,920,422 B2 | 7/2005 | Kroon et al. | |
| 7,003,794 B2 | 2/2006 | Arye | |
| 7,155,735 B1 | 12/2006 | Ngo et al. | |
| 7,403,660 B2 | 7/2008 | Hannuksela | |
| 2002/0002708 A1 | 1/2002 | Arye | |
| 2002/0040481 A1 | 4/2002 | Okada et al. | |
| 2002/0047902 A1 | 4/2002 | Thomas et al. | |
| 2002/0067436 A1 | 6/2002 | Shirahama et al. | |
| 2002/0101581 A1 | 8/2002 | Murakawa et al. | |
| 2002/0116715 A1 | 8/2002 | Apostolopoulos | |
| 2002/0129374 A1 | 9/2002 | Freeman et al. | |
| 2002/0136538 A1 | 9/2002 | Chen | |
| 2002/0141740 A1 | 10/2002 | Matsui | |
| 2002/0181581 A1 * | 12/2002 | Birru et al. | 375/240.01 |
| 2002/0191116 A1 | 12/2002 | Kessler et al. | |
| 2002/0191712 A1 | 12/2002 | Gaddam et al. | |
| 2004/0028076 A1 | 2/2004 | Strolle et al. | |
| 2004/0028228 A1 | 2/2004 | Hamada et al. | |
| 2004/0101057 A1 | 5/2004 | Shiraishi et al. | |
| 2004/0162078 A1 | 8/2004 | Ramaswamy et al. | |
| 2005/0024543 A1 | 2/2005 | Rasaswamy et al. | |
| 2006/0050780 A1 | 3/2006 | Cooper et al. | |
| 2006/0050781 A1 | 3/2006 | Cooper et al. | |
| 2006/0056505 A1 | 3/2006 | Ramaswamy et al. | |
| 2006/0117360 A1 | 6/2006 | Cooper et al. | |
| 2008/0030623 A1 | 2/2008 | Rasaswamy et al. | |

FOREIGN PATENT DOCUMENTS

| | | |
|---|---|---|
| EP | 1306992 | 5/2003 |
| JP | 06334573 A | 12/1994 |
| JP | 1045342 | 5/1998 |
| JP | 2000078116 | 3/2000 |
| JP | 2000228765 A | 8/2000 |
| JP | 2000354023 | 12/2000 |
| JP | 2001285736 | 10/2001 |
| JP | 2002152152 A | 5/2002 |
| JP | 2002223441 | 8/2002 |
| JP | 2002344838 | 11/2002 |
| WO | WO00/14967 | 3/2000 |
| WO | WO 00/16544 | 3/2000 |
| WO | WO01/74086 | 10/2001 |
| WO | WO 02/33965 | 4/2002 |

OTHER PUBLICATIONS

R. Steele et al. "Time Diversity With Adaptive Error Detection to Combat Rayleigh Fading in Digital Mobile Radio" IEEE Transactions on Communications, IEEE Inc., New York US, vol COM-31, No. 3 Mar. 1983, pp. 378-387.

* cited by examiner

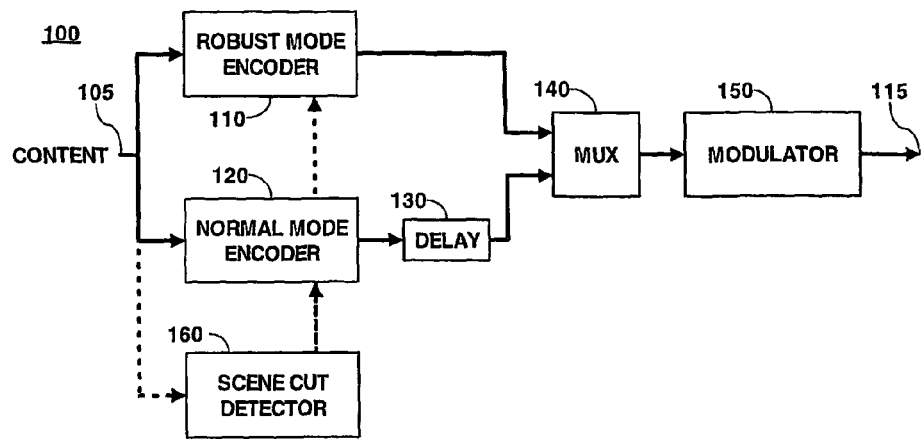
Fig. 1 Transmitter
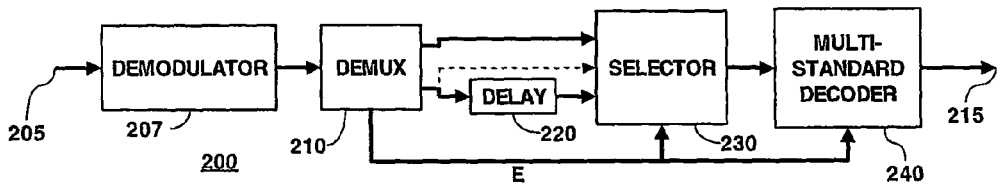
Fig. 2 Receiver
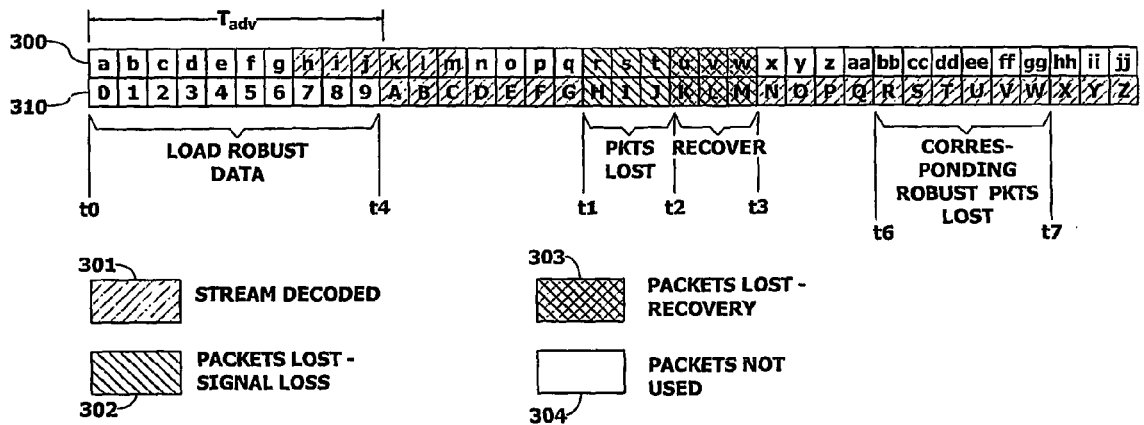
Fig. 3 Packet Streams

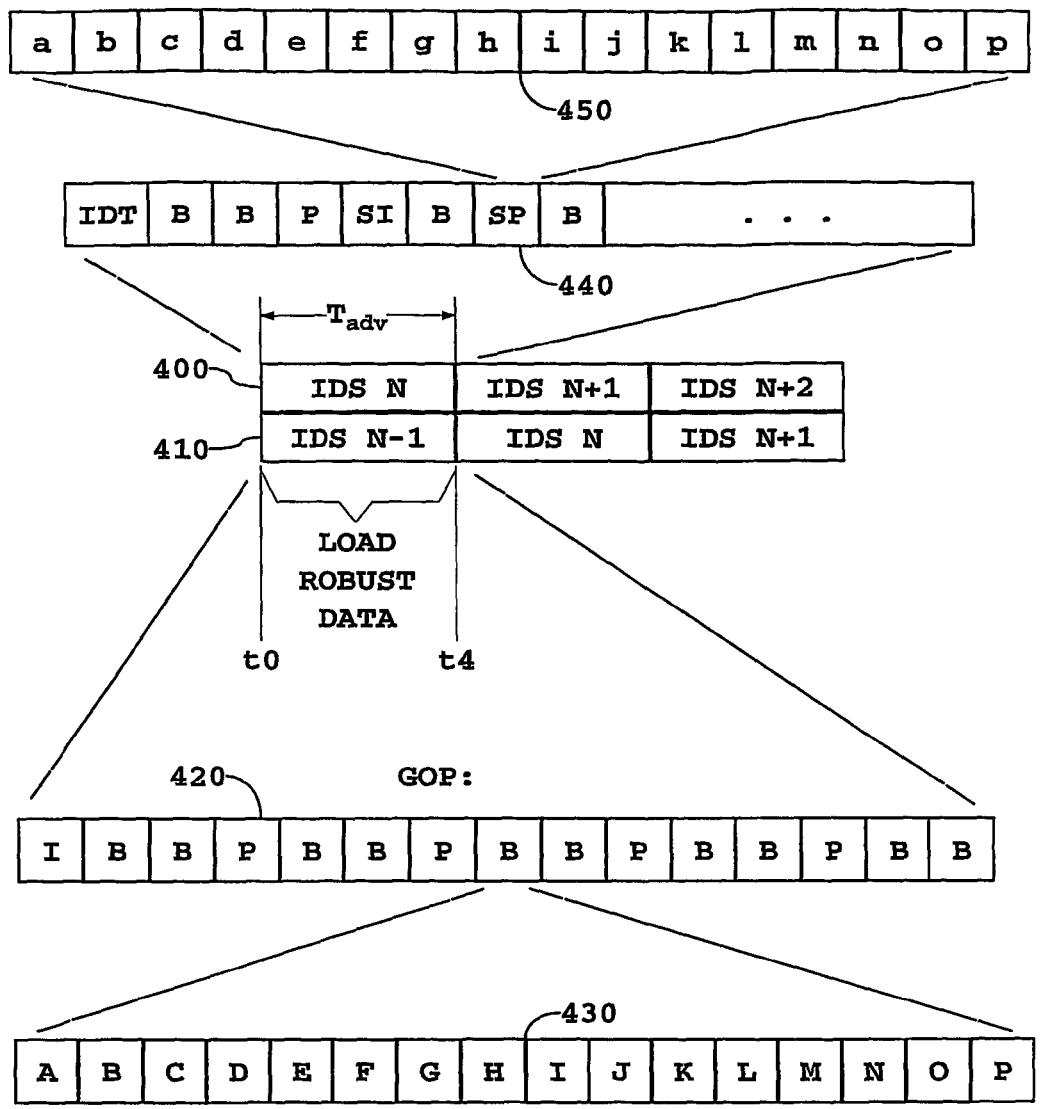
Fig. 4 GOP Streams

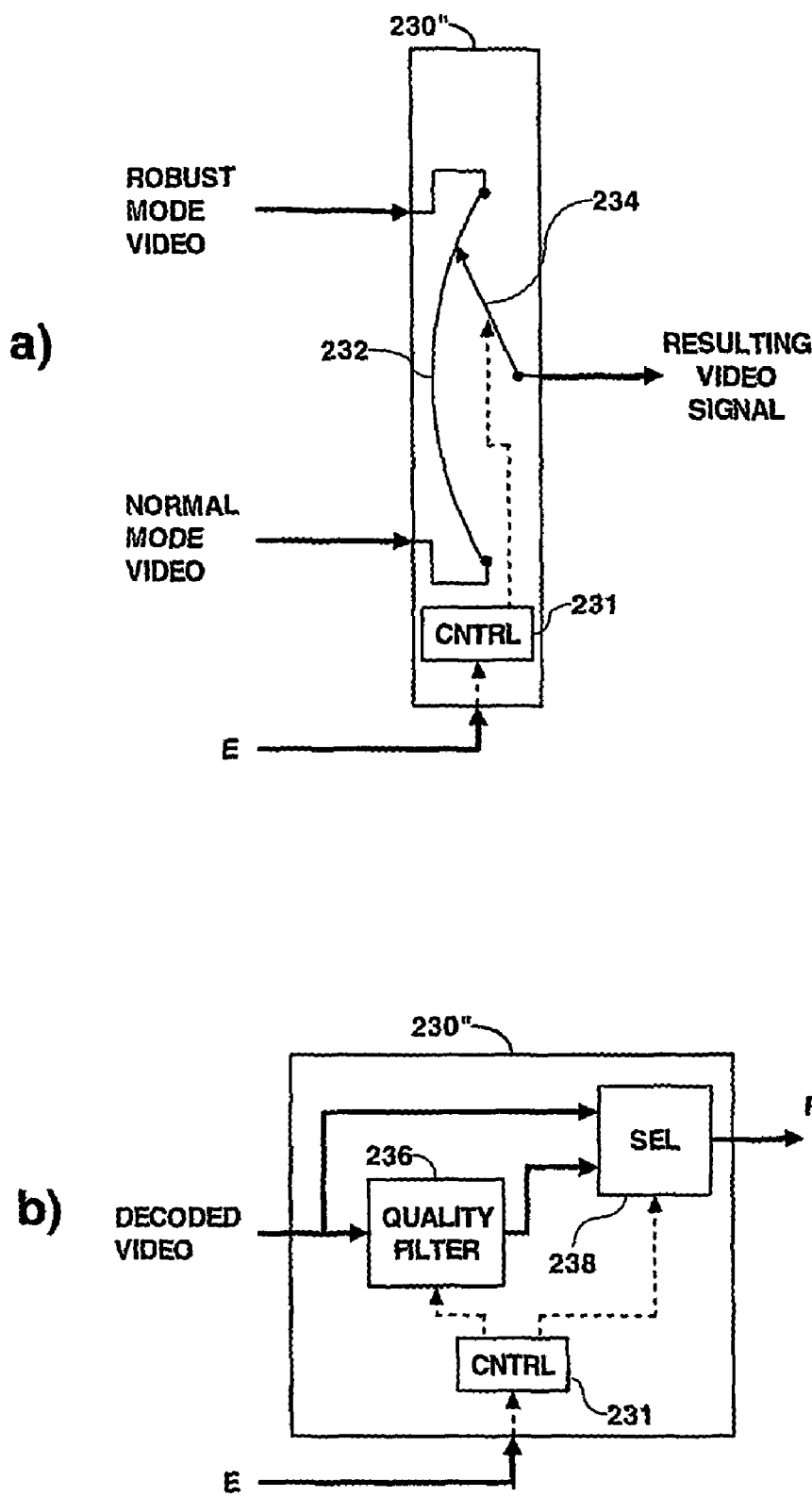
Fig. 5 Smoothing selector

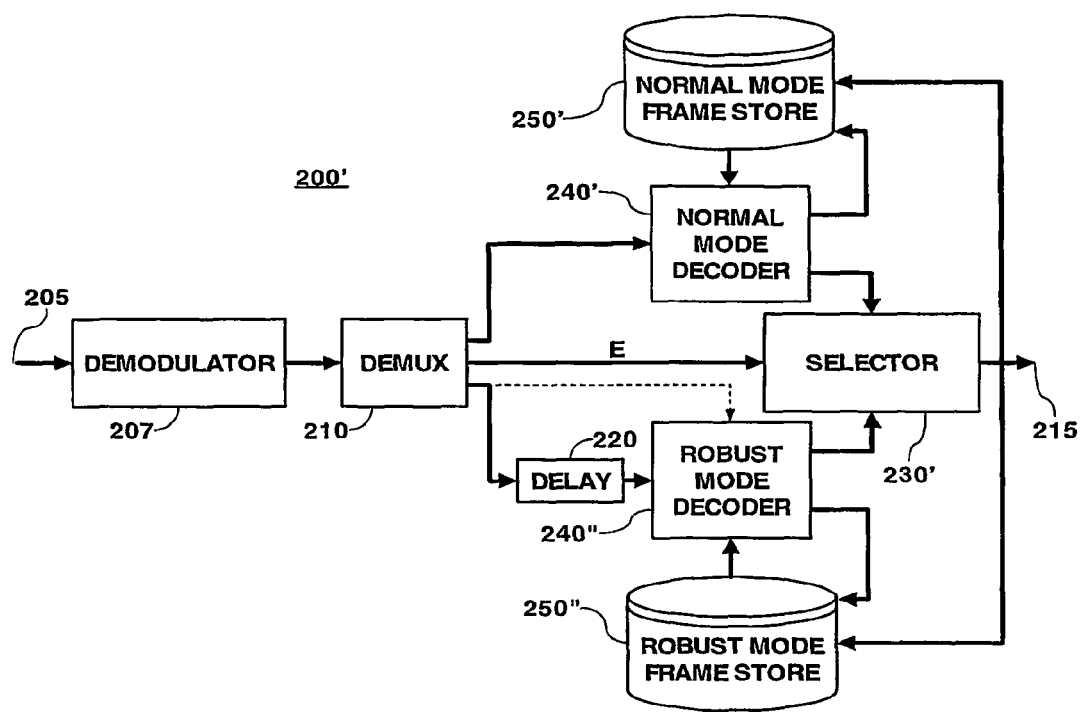
Fig. 6 Picture layer receiver

MPEG:

| CODED | I | B | B | P | B | B | P | B | B | P | B | B | P | B | B |
|---|---|---|---|---|---|---|---|---|---|---|---|---|---|---|---|
| FRAMES | 0 | 1 | 2 | 3 | 4 | 5 | 6 | 7 | 8 | 9 | 10 | 11 | 12 | 13 | 14 |

JVT:

SLICES

| CODED | IDR | | | | | | ... | |
|---|---|---|---|---|---|---|---|---|

| FRAMES | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|

OUTPUT:

| FRAMES | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| SOURCE | M | M | M | M | M | M | J | M | M | M | XX | M | M | J | M |

Fig. 7 Picture layer streams

| | | | |
|---|---|---|---|
| Number_of Robust_simulcast_channels | 802 | up to 256 channels supported | 8 bit unit |
| For (i=0;i<number_of_robust_simulcast_channels;i++){ | | | |
| Robust_Mode_PID | 804 | Identifies this channel in the TS | 16 bit unit |
| Simulcast_data_type | 806 | 0 = video<br>1 = audio<br>2 = data | 2 bit unit |
| If(Simulcast_data_type_=_0){ | 812 | | |
| Robust_Mode_video_compression_format | | 0 = ATSC MPEG2 MP@HL<br>1 = JVT MP@level<br>all others reserved_for_future_use | 6 bit unit |
| Robust_Mode_video_frame_rate | | Frame rate in frames per second | 7 bit unit |
| Robust_Mode_video_frame_interlaced | | If 0 then progressive, else interlaced | 1 bit unit |
| Robust_Mode_video_frame_horz | | Horizontal frame resolution | 16 bit unit |
| Robust_Mode_video_frame_vert | | Vertical frame resolution | 16 bit unit |
| Robust_Mode_video_frame_bitrate | | Video elementary stream bit rate in bps | 32 bit unit |
| Else | 814 | | |
| Robust_Mode_audio_compression_format | | 0 ATSC AC-3<br>1 MP3pro<br>all others reserved | 6 bit unit |
| Robust_Mode_audio_bitrate | | Audio elementary bit rate in bps | 24 bit unit |
| Robust_Mode_audio_sample_rate | | Audio sample rate in Ksamples per sec | 8 bit unit |
| Robust_Mode_audio_mode | | 0 5.1 channels<br>1 2 channel<br>others | 8 bit unit |
| } | | | |
| Normal_mode_simulcast_PID | 808 | PID of the normal channel which this robust mode channel duplicates. | 16 bit unit |
| Robust_to_Normal_delay_offset | 810 | A 32 bit value in 90 KHZ clock cycles indicating the delay from robust channel to the normal channel | 32 bit unit |
| Robust_Mode_High_Quality | 816 | IF 0 THEN the receiver should use the normal channel if available ELSE the broadcaster recommends use of the robust channel instead of the normal channel | 1 bit unit |
| } // end for loop robust channels | | | |

Fig. 8 PSIP/VCT Table

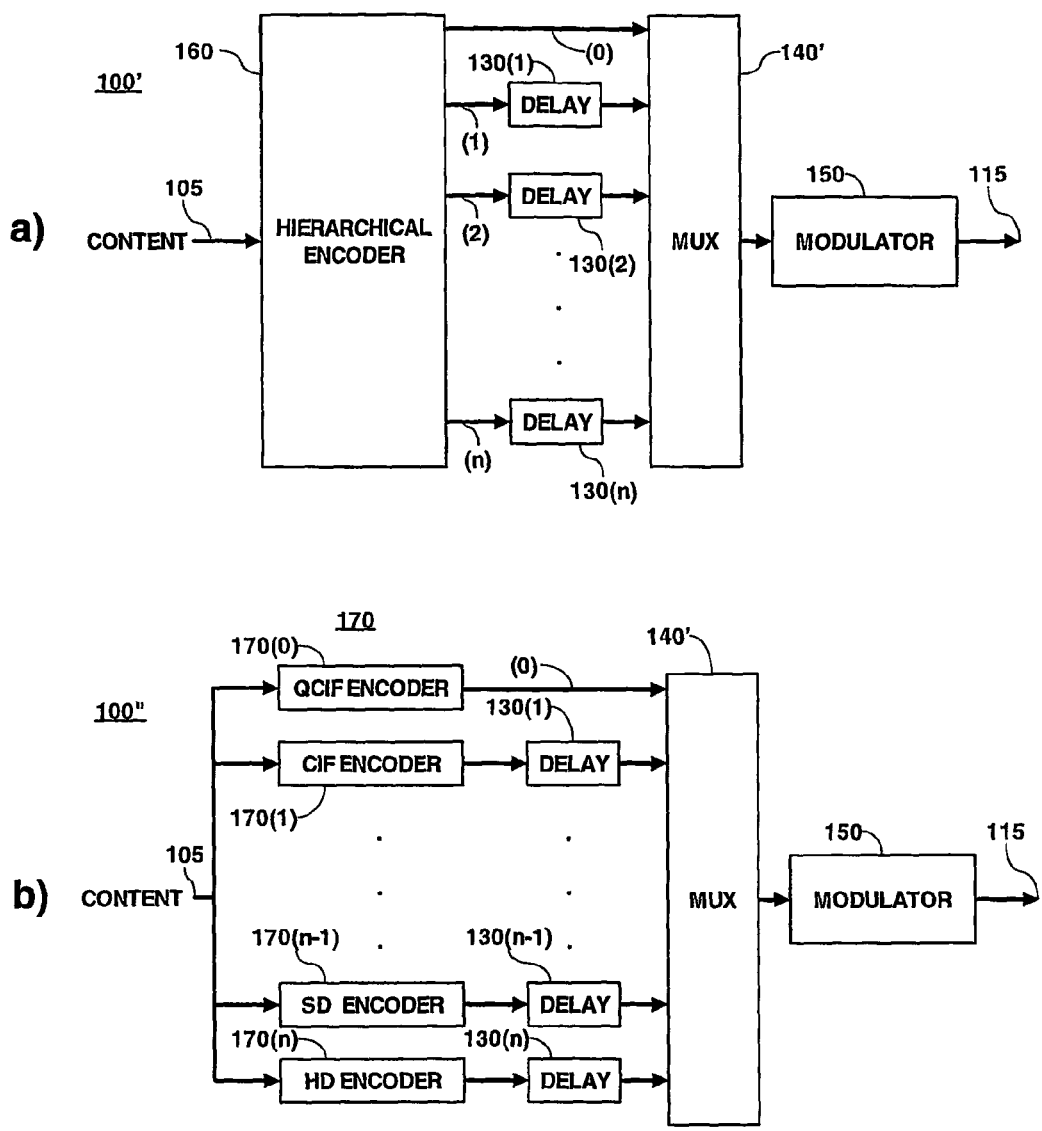
Fig. 9 Multiresolution transmitter

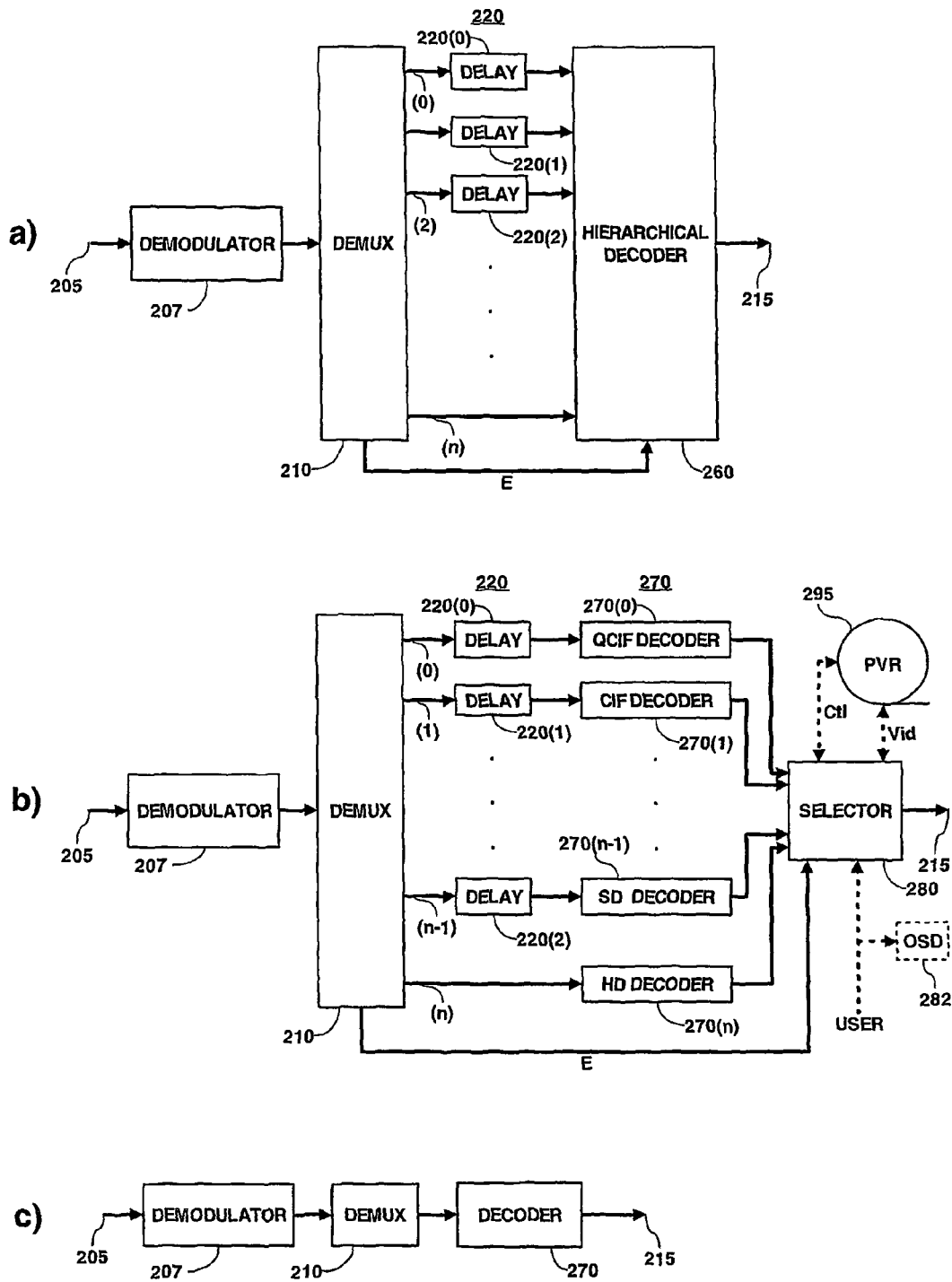
Fig. 10 Multiresolution receiver

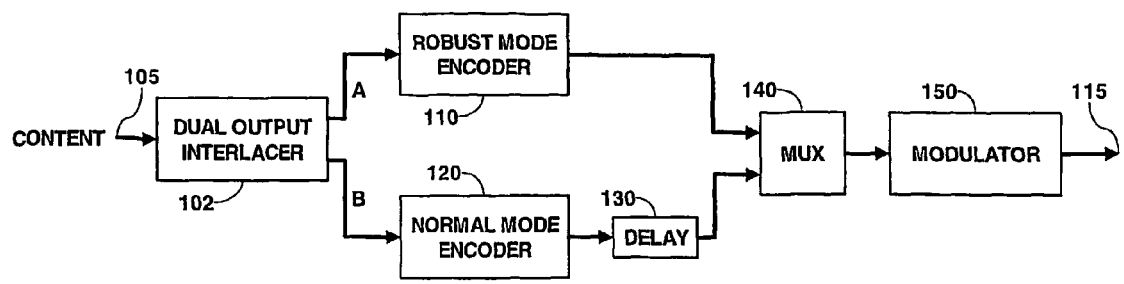
Fig. 11 Dual interlace transmitter
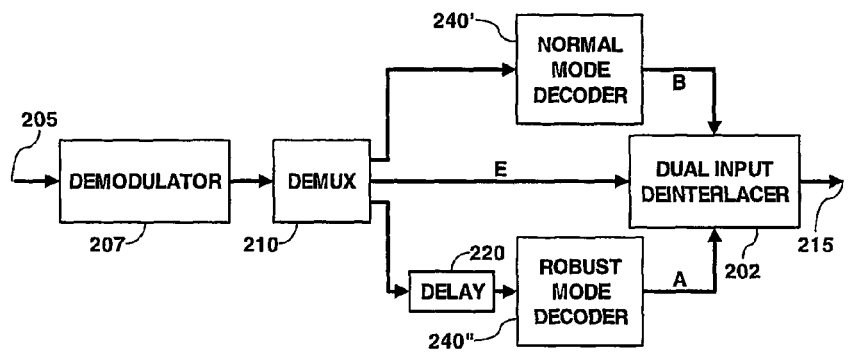
Fig. 12 Dual interlace receiver

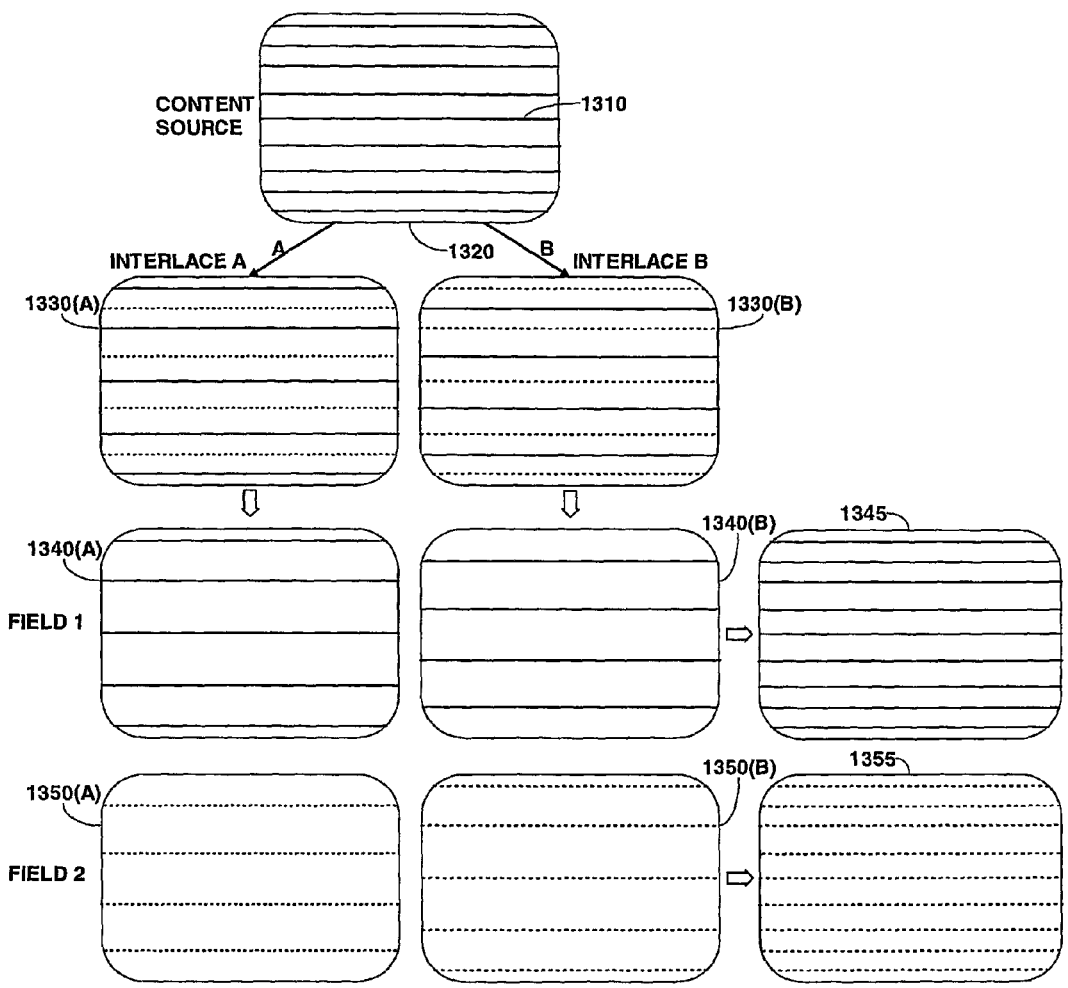
Fig. 13 Dual interlace display images

ROBUST MODE STAGGERCASTING STORING CONTENT

This application claims the benefit, under 35 U.S.C. § 365 of International Application PCT/US04/02062, filed 26 Jan. 2004, which was published in accordance with PCT Article 21(2) on Aug. 12, 2004 in English and which claims the benefit of United States provisional patent application No. 60/443,672, filed Jan. 28, 2003. This application is related to copending, commonly assigned, U.S. patent application Ser. No., 10/486,400, entitled ROBUST RECEPTION OF DIGITAL BROADCAST TRANSMISSION, filed on Jul. 17, 2002; Ser. No. 11/716,921, entitled ROBUST RECEPTION OF DIGITAL BROADCAST TRANSMISSION, filed on Mar. 12, 2007; Ser. No. 10/543,044 entitled ROBUST MODE STAGGERCASTING, filed on Jan. 20, 2004; Ser. No. 10/542,976 entitled ROBUST MODE STAGGERCASTING WITHOUT ARTIFACTS, filed on Jan. 21, 2004; Ser. No. 10/543,043 entitled ROBUST MODE STAGGERCASTING WITH ADJUSTABLE DELAY OFFSET, filed on Jan. 21, 2004; Ser. No. 10/543,483 entitled ROBUST MODE STAGGERCASTING REDUCED RESOLUTION VIDEO FOR MOBILE RECEIVER, filed on Jan. 22, 2004; Ser. No. 10/543,368 entitled ROBUST MODE STAGGERCASTING WITH MULTIPLE DELAYS FOR MULTI-RESOLUTION SIGNALS, filed on Jan. 23, 2004; Ser. No. 10/543,481 entitled ROBUST MODE STAGGERCASTING FAST CHANNEL CHANGE, filed on Jan. 23, 2004; and Ser. No. 10/524,972 entitled ROBUST MODE STAGGERCASTING USER CONTROLLED SWITCHING MODES, filed on Jan. 27, 2004.

BACKGROUND OF THE INVENTION

1. Field of the Invention

The present invention relates to staggercasting methods and apparatus.

2. Background of the Invention

Current digital television transmission standards in the United States, as proposed by the Advanced Television Systems Committee (ATSC) dated Sep. 16, 1995, incorporated by reference herein, use a single carrier modulation technique: eight level vestigial sideband modulation (8-VSB). Because it is a single carrier modulation technique, it is susceptible to signal degradation in the communications channel, such as fading caused by multipath and other signal attenuation. While some such fading may be compensated by channel equalization techniques, if the fade is long enough and severe enough, then the receiver will lose the signal and the demodulator system will lose synchronization. Reacquiring the signal, and resynchronizing the demodulator can take several seconds and is quite objectionable to a viewer.

To overcome this problem, a first ATSC proposal permits creation of a second communications channel by permitting use of a more robust modulation technique for a limited period of time, e.g. less than 10%. For example, a 2 or 4-VSB modulation technique may be used for selected frames. A second ATSC proposal permits a more robust encoding technique, e.g. trellis encoding, while maintaining an 8-VSB modulation technique. Such a system permits improved performance with compatible receivers while maintaining backwards compatibility with existing receivers.

Another known technique for overcoming fading is staggercasting. PCT Application No. US02/22723 filed Jul. 17, 2002, by K. Ramaswamy, et al., and PCT Application No. US02/23032 filed Jul. 19, 2002 by J. A. Cooper, et al., incorporated by reference herein, disclose staggercasting communications systems. Staggercasting communications systems transmit a composite signal including two component content representative signals: one of which is delayed with respect to the other. Put another way, one of the component content representative signals is advanced with respect to the other. The composite signal is broadcast to one or more receivers through a communications channel. At a receiver, the advanced-in-time component content representative signal is delayed through a delay buffer so that it becomes resynchronized in time with the other component content representative signal. Under normal conditions, the undelayed received component content representative signal is used to reproduce the content. If, however, a signal fade occurs, then the previously received and advanced-in-time content representative signal in the delay buffer is used to reproduce the content until either the fade ends and the composite signal is available again, or the delay buffer empties. If the delay period, and the associated delay buffer, is large enough then most probable fades may be compensated for.

PCT Application No. US02/22723 filed Jul. 17, 2002, by K. Ramaswamy, et al., and PCT Application No. US02/23032 filed Jul. 19, 2002 by J. A. Cooper, et al. also disclose a staggercasting system in which one of the component signals in the composite signal represents the content at a higher quality than the other component signal. In this arrangement, the lower quality component signal is advanced in time relative to the higher quality component signal. As described above, at the receiver under normal conditions, the undelayed received component, which in this case is the higher quality component signal, is used to reproduce the content. If, however, a signal fade occurs, then the previously received and advanced-in-time content representative signal, which in this case is the lower quality component signal, in the delay buffer is used to reproduce the content until either the fade ends and the composite signal is available again, or the delay buffer empties. This permits reproduction of a higher quality signal under normal conditions, and reproduction of a lower quality signal in the presence of a fade event. Because the lower quality signal requires fewer bits to transmit, the overhead required to provide fade resistance is decreased.

Reductions in size of storage devices have made it possible to incorporate such storage devices in many electronic systems. For example, televisions receiver set-top-boxes, for both cable and satellite reception, incorporate such storage devices.

BRIEF SUMMARY OF THE INVENTION

The inventors have realized that this concept may be expanded to a system in which multiple component signals, all representing the content but at differing qualities, are included in the composite signal. The component signal representing the content at the lowest quality is undelayed in the composite signal. The higher quality component signals are delayed with respect to the lowest quality encoded signal: the higher the quality of the component signal, the longer the delay. In such a system, when all component signals are available, then content representative signals of all the qualities may be reproduced. Further, some or all of the component signals may be encoded using a relatively robust encoding.

The inventors have also realized that such staggercasting communications systems may also be adapted to operate with electronic storage devices in an enhanced manner. In such a system, one of the received content representative signals will be stored in the storage device. There are conditions where a user will want to specify storage of a content representative signal at a desired quality, from among the available content representative signals.

In accordance with principles of the present invention, a method and apparatus for storing staggercasted content includes encoding a set of signals representing content. The set of signals is capable of being decoded to produce a corresponding set of decoded signals, each decoded signal having a quality different from the qualities of the decoded signals corresponding to the other encoded signals. A composite signal comprising the set of encoded signals, staggered in time, is generated. The set of encoded signals is extracted from the composite signal. Errors in the set of extracted encoded signals are detected to produce a subset of available extracted encoded signals which are not erroneous. A content representative signal at a selectable desired quality is decoded. The decoded content representative signal is then stored in a storage device.

BRIEF DESCRIPTION OF THE DRAWING

FIG. 1 is a block diagram of a portion of a staggercasting transmitter;

FIG. 2 is a block diagram of a portion of a staggercasting receiver;

FIG. 3 is a packet timing diagram useful in understanding the operation of the staggercasting communications system illustrated in FIG. 1 and FIG. 2;

FIG. 4 is a GOP timing diagram useful in understanding the operation of an enhanced staggercasting communications system;

FIG. 5 is a block diagram of a selector which may be used in the receiver illustrated in FIG. 2;

FIG. 6 is a block diagram of a portion of another embodiment of a staggercasting receiver;

FIG. 7 is a video frame timing diagram useful in understanding the operation of the staggercasting receiver illustrated in FIG. 6;

FIG. 8 illustrates an extended syntax and semantics for the program map table (PMT) and/or program and information systems protocol—virtual channel table (PSIP-VCT);

FIG. 9 is a block diagram of a portion of another embodiment of a staggercasting transmitter for transmitting multiple resolution version of a content representative signal;

FIG. 10 is a block diagram of a portion of another embodiment of a staggercasting receiver for receiving a transmitted multiple resolution version of a content representative signal;

FIG. 11 is a block diagram of a portion of a transmitter for transmitting a dual interlaced content representative signal;

FIG. 12 is a block diagram of a portion of a receiver for receiving a dual interlaced content representative signal; and FIG. 13 is a display diagram useful in understanding the operation of the dual interlace transmitter illustrated in FIG. 11 and dual interlace receiver illustrated in FIG. 12.

DETAILED DESCRIPTION OF THE INVENTION

FIG. 1 is a block diagram of a portion of a staggercasting transmitter 100 according to principles of the present invention. One skilled in the art will understand that other elements, not shown to simplify the figure, are needed for a complete transmitter. One skilled in the art will further understand what those elements are and how to select, design, implement and interconnect those other elements with the illustrated elements.

In FIG. 1, a source (not shown) of content, which in the illustrated embodiment may be a video image signal, audio sound image, program data, or any combination of these, provides a content representative signal to an input terminal 105 of the transmitter 100. The input terminal 105 is coupled to respective input terminals of a robust mode encoder 110 and a normal mode encoder 120. An output terminal of the robust mode encoder 110 is coupled to a first input terminal of a multiplexer 140. An output terminal of the normal mode encoder 120 is coupled to an input terminal of a delay device 130. An output terminal of the delay device 130 is coupled to a second input terminal of the multiplexer 140. An output terminal of the multiplexer 140 is coupled to an input terminal of a modulator 150. An output terminal of the modulator 150 is coupled to an output terminal 115. The output terminal 115 is coupled to a communications channel (not shown).

In operation, the normal mode encoder 120 encodes the content video, audio and/or data using a source encoding technique. In the illustrated embodiment, the source encoding technique is the MPEG 2 encoding technique, although any such source encoding technique may be used. The source encoding process is performed using predetermined parameters including resolution, frame rate, quantization level, etc. Further processing is performed in the normal mode encoder 120 to system encode the source encoded content representative signal. In the illustrated embodiment, the source coded content representative signal is formed into a series of transport packets containing the encoded video, audio and/or data. These transport packets are formatted according to the MPEG 2 standard, although any such system encoding may be used.

The robust mode encoder 110 also encodes the content video, audio and/or data, using a source encoding technique. The source encoding technique used by the robust mode encoded 110 is more robust compared with the source encoding technique of the normal mode encoder 120. In the illustrated embodiment, the robust mode encoding used is a video coding technique designated MPEG AVC/H.264 currently being developed by the Joint Video Team (JVT) of the ISO/IEC MPEG and ITU-T VCEG committees, and termed JVT coding below. However, any such source encoding technique may be used. For example, other source coding techniques, such as enhanced trellis coding, which provide robust encoding relative to the MPEG normal mode encoder 120, may also be used. The robust encoding process is also performed using predetermined parameters including resolution, frame rate, quantization level, etc., but the values of these parameters may be different for the robust encoding process than those for the normal encoding process. Processing is also performed in the robust mode encoder 110 to system encode the source encoded content representative signal. In the illustrated embodiment, the source coded content representative signal is formed into a series of transport packets, also according to the MPEG 2 standard, although, again, any such system encoding may be used.

The normal mode encoded signal is delayed by the delay device 130 by an amount intended to allow the system to operate through a range of expected fade periods. The value of this parameter depends on the characteristics of the communications channel. For example, in an urban setting, with many buildings and moving objects, such a airplanes, fading is much more common and can last longer than in rural flat settings. In the illustrated embodiment, the delay may be varied from around 0.5 seconds to several seconds.

FIG. 3 is a packet timing diagram useful in understanding the operation of the staggercasting communications system illustrated in FIG. 1 and FIG. 2. FIG. 3 illustrates the system coded transport packet streams at the input terminal of the multiplexer 140. In FIG. 3, packets from the robust mode encoder 110 are represented by a horizontal row of squares 300, labeled using lower case letters: "a", "b", "c", and so forth. Packets from the normal mode encoder 120 are represented by a horizontal row of squares 310, labeled using numbers: "0", "1", . . . , and upper case letters: "A", "B", "C", and so forth. Packets labeled by the same letter contain data representing content from the same time. That is, packet "a" from the robust mode encoder 110 contains data representing content which corresponds in time to the content represented by the data in packet "A" from the normal mode encoder 120. Each packet in the normal mode and robust mode packet streams contains data in the header identifying them as belong to that packet stream. The delay device 130 delays the normal mode encoder 120 packets by a time delay $T_{adv}$. That is, robust mode packets are advanced in time by $T_{adv}$ with respect to corresponding normal mode packets. In the embodiment illustrated in FIG. 3, $T_{adv}$ is ten packet time periods. This time period may vary from around 0.5 seconds to several seconds, as described above.

The robust mode and delayed normal mode packet streams are multiplexed together into a composite packet stream in the multiplexer 140. The composite packet stream is time domain multiplexed, meaning that a single data stream carrying successive packets, one at a time, is produced. Additional packets containing other data, such as identification and control data (not shown), may also be multiplexed into the composite packet stream produced by the multiplexer 140. In addition, other packet streams representing other content sources (also not shown), possibly including both normal mode and robust mode packet streams representing one or more of the other content representative signals, may also be multiplexed into the composite packet stream produced by the multiplexer 140, all in a known manner. The packet streams 300 and 310 in FIG. 3 represent the component content representative signals in the composite packet stream. As may be seen, packet "A" from the normal mode encoder 120 is transmitted at the same time as packet "k" from the robust mode encoder 110.

The composite packet stream from the multiplexer 140 is then channel coded for transmission over the communications channel. In the illustrated embodiment, the channel coding is done by modulating the composite packet stream in the modulator 150. The channel coding for the normal mode packet stream is different from the channel coding for the robust mode packet stream. More specifically, the modulation applied to the robust mode packet stream is more robust than that applied to the normal mode packet stream. In the illustrated embodiment, when packets in the normal mode packet stream are modulated, the modulation is 8-VSB modulation according to the ATSC standard. When packets in the robust mode packet stream are modulated, the modulation is more robust modulation, for example 4-VSB or 2-VSB, as described above.

In short, in the illustrated embodiment, the normal mode packet stream is source encoded using the MPEG 2 encoding technique and is channel encoded using 8-VSB modulation. This is fully backward compatible with the prior ATSC standard. Also in the illustrated embodiment, the robust mode packet stream is source encoded using the JVT encoding technique and is channel encoded using 4-VSB and/or 2-VSB modulation. One skilled in the art will understand that the new ATSC standard, referred to above, refers only to the channel encoding of the robust mode packet stream, i.e. 4-VSB and/or 2-VSB, and does not specify a source encoding technique. Consequently, any such source encoding technique may be used according to the standard, and the JVT encoding technique in the illustrated embodiment is one example of such source encoding for the robust mode packet stream. In the remainder of this application, 'normal mode packet stream' will refer to the packet stream which is source encoded using the MPEG 2 source encoding technique, system encoded into packets according to the MPEG 2 standard, and channel encoded using 8-VSB modulation; and 'robust mode packet stream' will refer to packets which are source encoded using the JVT source encoding technique, system encoded into packets according to the MPEG 2 standard, and channel encoded using 4-VSB and/or 2-VSB modulation.

The modulated composite signal is then supplied to the communications channel (not shown), which may be a wireless RF channel, or a wired channel, such as a cable television system. The composite signal may be degraded by the communications channel. For example, the signal strength of the composite signal may vary. In particular, the composite may fade due to multipath or other signal attenuation mechanisms. One or more receivers receive the possibly degraded composite signal from the communications channel.

FIG. 2 is a block diagram of a portion of a staggercasting receiver 200 according to principles of the present invention. In FIG. 2, an input terminal 205 is connectable to the communications channel (not shown) so that it is capable of receiving the modulated composite signal produced by the transmitter 100 (of FIG. 1). The input terminal 205 is coupled to an input terminal of a demodulator 207. An output terminal of the demodulator 207 is coupled to an input terminal of a demultiplexer 210. A first output terminal of the demultiplexer 210 is coupled to a selector 230. A second output terminal of the demultiplexer 210 is coupled to a delay device 220. An output terminal of the delay device 220 is coupled to a second input terminal of the selector 230. An output terminal of the selector 230 is coupled to a signal input terminal of a multi-standard decoder 240. A control signal output terminal of the demultiplexer 210 is coupled to respective corresponding input terminals of the selector 230 and the multi-standard decoder 240. An output terminal of the multi-standard decoder 240 is coupled to an output terminal 215 The output terminal 215 produces a content representative signal which is supplied to utilization circuitry (not shown) such as a television receiver with an image reproduction device to reproduce the image represented by the video content, a sound reproduction device to reproduce the sound represented by the audio content, and possibly including user input devices to allow a viewer to interact with the received data content.

In operation, the demodulator 207 demodulates the received modulated signal using the appropriate demodulation techniques required to receive packets from either the normal mode packet stream (8-VSB) or robust mode packet stream (4-VSB and/or 2-VSB). The resulting signal is a received composite packet stream signal. The received composite packet stream signal is demultiplexed by the demultiplexer 210 into respective normal mode source encoded and robust mode source encoded component packet streams according to the identification data in the header of each received packet. The received normal mode packet stream is supplied directly to the selector 230. The received robust mode packet stream is passed through the delay device 220, which delays the received robust mode packet stream by the same time duration that, in the transmitter 100 of FIG. 1, the normal packet stream is delayed. Consequently, the content represented by the two packet stream signals at the input terminals of the selector 230 is time aligned.

The demultiplexer 210 also produces an error signal at the control signal output terminal should a portion of the received composite signal be unusable. Any of several techniques may be used, for example, a signal-to-noise ratio detector or a bit-error rate detector. In addition, an error in the received composite signal may be detected by detecting missing packets. Each packet includes in its header both data identifying which packet stream the packet belongs to and a packet sequence number. If a sequence number for a packet stream is missed, then a packet is missing, and an error is detected. In this case, the packet stream from which the packet is missing may be noted, and only that packet stream detected as having an error. These or any other such detector may be used, alone or in combination.

Although the control signal is illustrated as emanating from the demultiplexer 210, one skilled in that art will understand that different error detectors may be require signals from different places in the receiver. Whatever arrangement is used, an error signal E is generated which is active when a portion of the composite signal is unusable. The selector 230 is conditioned to pass one of the two packet streams signals to the multi-standard decoder 240 in response to this error signal E. The multi-standard decoder 240 is conditioned to decode that packet stream signal, in a manner to be described in more detail below.

The multi-standard decoder 240 performs both system decoding (depacketizing) and source decoding of whichever packet stream is supplied to it by the selector 230. The multi-standard decoder 240 can be configured to perform source decoding of the packet stream signals according to different coding standards. For example, when a normal mode encoded packet stream is received from the selector 230, the multi-standard decoder 240 is configured to depacketize and source decode these packets according to the MPEG 2 standard and regenerate the content representative signal. Similarly, when a robust mode encoded packet stream is received from the selector 230, the multi-standard decoder 240 is configured to depacketize the packets according to the MPEG 2 standard and to source decode these packets according to the JVT standard, and regenerate the content representative signal.

The operation of the receiver 200 of FIG. 2 may be understood by referring again to FIG. 3. Time to may represent the time when the receiver is turned on, or when a user specifies a new content source to receive. During the time, $T_{adv}$, between t0 and t4, robust mode packets "a" to "j" are loaded into the delay device 220, and normal mode packets, designated "0" though "9" are received. At time t4, the normal mode packet "A" becomes available from the demultiplexer 210 and delayed robust mode packet "a" becomes available from the delay device 220. Under normal conditions, the error signal is not active on the error signal line E. In response, the selector 230 couples the normal mode packet stream to the multi-standard decoder 240, and the multi-standard decoder 240 begins to generate the content representative signal from the normal mode packets, as described above. This is illustrated by the cross hatching 301 in the normal mode packets "A" through "G".

From time t1 to t2 a severe fade occurs in the communications channel and from time t2 to t3 the receiver recovers the modulated signal and resynchronizes to that signal. During this time, from t1 to t3, normal mode packets "H" to "M" and robust mode packets "r" to "w" are lost. This is indicated by the cross hatching 302 and 303 in those packets. However, robust mode packets "h" to "m" have been previously successfully received. Because of the delay device 220, these robust mode packets are available at the other input to the selector 230 from time t1 to t3.

The occurrence of the fade is detected and indicated by an active error signal on the error signal line E. In response to the active error signal on the error signal line E, the selector 230 couples the previously received robust mode packets "h" to "m" to the multi-standard decoder 240. Concurrently, the multi-standard decoder 240 is configured to depacketize and decode robust mode packets. Consequently, from time t1 to t3, packets "h" to "m" from the robust mode packet stream are decoded and the content representative signal remains available to the utilization circuitry (not shown). This is illustrated by the cross hatching 301 in the robust mode packets "h" through "m".

At time t3, the fade ends and the composite signal becomes available again. Consequently the normal mode packets "N", "O", "P", . . . , become available. The disappearance of the fade is detected and indicated by an inactive error signal on the error signal line E. In response, the selector 230 couples the normal mode packet stream to the multi-standard decoder 240. Concurrently, the multi-standard decoder 240 is configured to depacketize and decode normal mode packets and continues to generate the content representative signal.

During the fade and recovery, from time t1 to t3, robust packets "r" through "w" were lost. Consequently, from time t6 through t7, when normal mode packets "R" through "W" are received, there are no corresponding robust mode packets in the delay device 220. During this time, there is no protection against a fade. However, once the delay device is refilled, fade protection becomes available again.

As described above, the content representative signal remains available to the utilization circuitry (not shown) despite the occurrence of a fade from time t1 to t3. In addition, because of the robust source coding and channel coding (modulation) techniques, the robust mode packets are likely to survive more severe channel degradation, and thus be available when normal mode packets may not be. The quality of the content signal carried by the robust mode packet stream may be different from that in the normal mode packet stream. In particular, the quality of the content signal in the robust mode packet stream may be lower than that in the normal mode packet stream. A lower quality content signal requires fewer bits to transmit than a higher quality content signal, and such a robust mode packet stream will require a lower throughput than the normal mode packet stream. Thus, at the expense of a second, lower throughput packet stream, a system which will permit a graceful degradation in the event of a fading event is possible.

Also as described above, the content signal may include video, audio and/or data. In particular, audio data may be carried in both the normal mode packet stream and the robust mode packet stream so that audio data also remains available despite the occurrence of a fade. The audio content signal carried by the robust mode packet stream may have a different quality, specifically a lower quality, than that in the normal mode packet stream. An audio signal at a lower quality may be carried by fewer bits and fewer packets, and, thus, would make relatively low requirements on the robust mode packet stream. This also would permit a graceful degradation in the event of a fade event.

With a system described above, switching from the normal mode packet stream to the robust mode packet stream may occur at any time. If the robust packet stream carries content representative data which is identical to that in the normal packet stream down to the packet level, this may not present a problem. However, if the robust packet stream carries content representative data which is different from that in the normal packet stream, for example, if the content is represented at a different resolution, quantization level, frame rate, etc., then the viewer may notice a change in the reproduced image which may be objectionable. In a worse case, if a packet stream switch occurs in the middle of decoding a picture, then the decoding of that picture and other surrounding pictures may fail altogether, and the video image may be disrupted for a much longer period of time, until the decoder resynchronizes to an independently decodable picture.

As described above, the normal mode packet stream is carried by a combination of source, system and channel encoding. In the illustrated embodiment, the source and system coding is according to the known MPEG 2 coding scheme and the channel encoding uses the 8-VSB modulation technique. The MPEG source coding scheme encodes a video image signal as a sequence of independent decoding segments. An independent decoding segment (IDS), also termed an elementary stream segment, is a segment which may be decoded accurately independent of any other independent decoding segment. In the MPEG standard, independent decoding segments include a sequence, group of pictures (GOP) and/or picture. These independent decoding segments are delimited in the compressed bitstream by unique start codes. That is, an independent decoding segment is considered to be all the data beginning with a segment start code, up to but not including the next segment start code. Pictures in the MPEG 2 standard are either intra-coded (I pictures), inter-prediction (P pictures) or bidirectional prediction (B) pictures. I pictures are encoded without reference to any other pictures. A GOP includes a group of pictures encoded as a combination of I, P, and/or B pictures. In a closed GOP, all pictures in the GOP may be decoded without reference to pictures in any other GOP. The start of each GOP is clearly identified in the MPEG 2 packet stream.

Also as described above, the robust mode packet stream is carried by a combination of source, system and channel encoding. In the illustrated embodiment, the source encoding is according to the JVT encoding scheme, the system encoding is according to the MPEG 2 standard and the channel encoding uses the 2-VSB and/or 4-VSB modulation techniques. Pictures coded using the JVT source coding standard are made up of coded slices, and a given picture may contain slices of different coding types. Each slice may be an intra-coded (I) slice, an inter-predictive (P) slice, a bi-predictive (B) slice, an SI slice in which only spatial prediction is used, or an SP slice which may be accurately reproduced even when different reference pictures are used. The JVT source coding standard also includes an instantaneous decoding refresh (IDR) picture. An IDR is a particular type of JVT encoded picture, which contains only I slices and marks the beginning of an IDS. An IDR indicates that the current picture, and all later encoded pictures may be decoded without requiring reference to previous pictures. An IDR may be encoded once for every predetermined number of pictures, emulating a GOP in the MPEG 2 standard. In the JVT source encoding scheme, independent decoding segments may be delimited by IDRs, which are clearly identified in the JVT packet stream.

By imposing some constraints on the normal and robust source encoding schemes, a system may be developed which can switch from the normal mode packet stream to the robust mode packet stream while minimizing objectionable artifacts. If independent decoding segments are encoded to begin at identical content locations in both the normal (MPEG 2) and robust (JVT) packet streams, switches may be made between the normal and robust packet streams at independent decoding segment locations with minimal objectionable artifacts. In the illustrated embodiment, the independent decoding segment used in the normal (MPEG 2) packet stream is a closed GOP and begins with an I picture. In the corresponding robust (JVT) packet stream, each independent decoding segment begins with an IDR picture. The I picture in the normal (MPEG) mode packet stream and the IDR picture in the robust (JVT) mode packet stream both encode the same video picture from the content source (not shown). Both source encoding schemes permit IDSs to be formed and delimited in other manners. For example, the MPEG 2 source encoding scheme also permits slices to be formed to represent a picture. Any such manner may be used provided that IDSs are inserted into both packet streams at identical content locations.

Referring again to FIG. 1, the input terminal 105 is further coupled to an input terminal of a scene cut detector 160, illustrated in phantom. An output terminal of the scene cut detector 160 is coupled to respective control input terminals of the normal mode encoder 120 and the robust mode encoder 110.

In operation, the scene cut detector 160 detects the occurrence of a new scene in the video content. In response to detection of a new scene, a control signal is sent to the normal mode encoder 120 and the robust mode encoder 110. Both the normal mode encoder 120 and the robust mode encoder 110 begin encoding a new independent decoding segment in response to the control signal. The normal mode encoder 120 inserts a new I picture and the robust mode encoder 110 inserts an IDR picture into their respective encoded packet streams. The normal mode encoder 120 and the robust mode encoder 110 operate to generate corresponding independent decoding segments having the same time durations. As described above, the encoded content representative signals are system coded into respective packet streams.

The delay device 130 is set to introduce a delay equal to the independent decoding segment time duration. The multiplexer 140 combines the robust mode encoded packet stream and the delayed normal mode encoded packet stream into a composite packet stream. The composite packet stream is channel encoded (modulated) in an appropriate manner by the modulator 150 and supplied to the communications channel via the output terminal 115.

The operation of the transmitter in this mode of operation may be better understood by reference to FIG. 4. FIG. 4 illustrates the packet streams at the input to the multiplexer 140. In FIG. 4, a sequence of independent decoding segments (IDS) from the robust mode encoder 110 is illustrated as a series of rectangles 400, and a sequence of independent decoding segments from the normal mode encoder 120 is illustrated as a series of rectangles 410. As described above, the time locations within the content, and the durations of the independent decoding segments from the robust mode encoder 110 and the normal mode encoder 120 are the same. Because the delay introduced by the delay device 130 is the same as the time duration of an IDS, IDSs from the robust mode encoder 110 align with the immediately preceding IDS from the normal mode encoder 120.

At time t0, which may represent a change in scene, as detected by the scene cut detector 160, the undelayed robust mode encoded IDS N begins and the previously delayed normal mode encoded IDS N-1 begins. Each robust mode (JVT source coded) IDS is illustrated as a series of rectangles 440 representing respective slices, and begins with an independent decoding refresh (IDR) picture. The IDR picture is followed by B, P, SI, and/or SP slices. These slices are, in turn, system coded into a sequence 450 of transport packets "a", "b", "c", etc. Similarly, each normal mode IDS (MPEG 2 source coded) is illustrated as a series of rectangles 420 representing a GOP which begins with an I picture. The I picture is followed by an arrangement of P pictures and B pictures. These I, P and B pictures are, in turn, system coded into a sequence 430 of transport packets "A", "B", "C", etc. The illustrated arrangements are examples only, and any appropriate arrangement may be used.

This composite signal is received by a receiver. Referring again to the receiver 200 in FIG. 2, at time t0, the received robust mode IDS N is loaded into the delay device 220 during time $T_{adv}$. The delay device 230 introduces the same delay (one IDS time period) to the received robust packet stream that in the transmitter the delay device 130 introduced into the normal packet stream. Consequently, the received normal packet stream and delayed robust packet stream at the input terminals of the selector 230 are realigned in time with respect to the content representative signal.

Under normal conditions, the selector 230 couples the normal mode packet stream to the multi-standard decoder 240, and the multi-standard decoder is conditioned to decode normal mode packets, as described in more detail above. If an error is detected in the composite signal or a portion of it, as described above, then switching is performed between the normal mode packet stream and the robust mode packet stream. In this embodiment, at the beginning of the IDS, the selector 230 couples the robust mode packet stream to the multi-standard decoder 240, and the multi-standard decoder 240 is conditioned to decode robust mode packets, as described in more detail above. If no further errors are detected in the composite signal, then at the beginning of the next IDS, the selector 230 couples the normal mode packet stream to the multi-standard decoder 240 and the multi-standard decoder 240 is conditioned to decode normal mode packets again.

In the receiver 200 in FIG. 2 switching from decoding the normal mode packet stream to decoding the robust mode packet stream and vice versa occurs at the beginning of an IDS. Each IDS is an independent decoding segment, beginning with either an I picture (normal mode) or an IDR picture (robust mode), which may be successfully decoded without reference to any other picture. Further, subsequent pictures may be decoded without reference to pictures preceding the IDS. Thus, decoding and display of the content representative signal may be immediately performed without objectionable artifacts caused by the switching.

To further minimize video artifacts caused by switching from decoding a normal mode video packet stream to a robust mode packet stream, and vice versa, the image characteristics of the resulting video signal may be gradually changed between those of the normal mode video signal and those of the robust mode video signal when a switch occurs. This is especially desirable when the robust mode video stream is lower quality compared to the normal mode video stream, for example, if the spatial resolution, frame rate, etc. of the robust mode video stream is less than that of the normal mode video stream.

FIG. 5 is a block diagram of a selector 230" which may be used in the receiver illustrated in FIG. 3. Such a selector 230" may gradually change the video characteristics (e.g. resolution, frame rate, etc.) of the resulting video signal between those of the normal mode video signal and those of the robust mode video signal at the time of a switch between them. FIG. 5a is a functional diagram which illustrates the operation of selector 230", and FIG. 5b is a structural block diagram illustrating an embodiment of such a selector 230" which may be used in the receiver illustrated in FIG. 2.

In FIG. 5a, the robust mode video signal is coupled to one end of a track 232 and the normal mode video signal is coupled to the other end of the track 232. A slider 234 slides along the track 232 and generates a resulting video signal which is coupled to the output terminal of the selector 230". The resulting video signal is coupled to the output terminal 215 of the receiver 200 (of FIG. 2). A control input terminal is coupled to receive the error signal E from the demultiplexer 210. The control input terminal is coupled to an input terminal of a controller circuit 231. The position of the slider 234 along the track 232 is controlled by the controller circuit 231, as indicated in phantom.

In operation, when the slider 234 is at the upper end of the track 232, then a resulting video signal having the characteristics (e.g. resolution, frame rate, etc.) of the robust mode video signal is coupled to the output terminal of the selector 230". When the slider 234 is at the lower end of the track 232, then a resulting video signal having the characteristics of the normal mode video signal is coupled to the output terminal of the selector 230". As the slider 234 moves between the upper end and the lower end of the track 232, then the characteristics of the resulting video signal at the output terminal of the selector 230" is adjusted to be between those of the normal mode and robust mode video signals. The closer the slider 234 is to the upper end of the track 232, the closer the characteristics of the resulting video signal are those of the robust mode video signal than to those of the normal mode video signal. The closer the slider 234 is to the lower end of the track 232, the closer the characteristics of the resulting video signal are those of the normal mode video signal than to those of the robust mode video signal.

The value of the error signal E indicates when a switch is to occur, as described above. When a switch occurs from one video signal (e.g. the normal mode or robust mode video signal) to the other video signal, for a time interval of one or more video pictures around the time when the switch occurs, the slider 234 is gradually moved from one end of the track 232 to the other. For example, during a switch from the normal mode video signal to the robust mode video signal, the slider 234 begins at the bottom of the track. For several video pictures before the switch, the slider gradually moves from the bottom of the track 232 to the top. At the time of the switch from the normal mode packet stream to the robust mode packet stream, the slider is at the top of the track 232. Consequently, the characteristics of the resulting video signal gradually change from those of the normal video signal to those of the robust mode video signal during several video pictures before the switch to the robust mode packet stream occurs. Similarly, at the time of the switch from the robust mode packet stream to the normal mode packet stream, the slider is at the top of the track 232. For several video pictures after the switch, the slider gradually moves from the top of the track 232 to the bottom. Consequently, the characteristics of the resulting video signal gradually change from those of the robust video signal to those of the normal mode video signal during several video pictures after the switch to the normal mode packet stream occurs.

In FIG. 5b, the video signal from the multi-standard decoder 240 (of FIG. 2) is coupled to a first input terminal of a variable video quality filter 236 and a first input terminal of a selector 238. An output terminal of the video quality filter 236 is coupled to a second input terminal of the selector 238. An output terminal of the selector 238 generates the resulting video signal and is coupled to the output terminal 215 (of FIG. 2). The error signal E from the demultiplexer 210 is coupled to a controller circuit 231. A first output terminal of the controller circuit 231 is coupled to a control input terminal of the video quality filter 236 and a second output terminal of the controller circuit 231 is coupled to a control input terminal of the selector 238.

In operation, the video characteristics of the decoded video signal is varied by the video quality filter 236 in response to the control signal from the controller circuit 231. The control signal from the controller circuit 231 conditions the video quality filter 236 to produce a video signal having a range of video characteristics between those of the normal mode video signal and those of the robust mode video signal. Under normal conditions, when no switching occurs, the controller circuit 231 conditions the selector 238 to couple the decoder video signal to the output terminal as the resulting video signal.

In response to a change in the value of the error signal E, indicating a switch between the normal mode video signal and the robust mode video signal as described above, for a time interval near the switch time the controller circuit 231 conditions the selector 238 to couple the video signal from the video quality filter 236 to the output terminal and conditions the quality filter 236 to gradually change the video characteristics of the resulting video signal. More specifically, if a switch from the normal mode video signal to the robust mode video signal occurs, for a time interval of several video pictures before the switch occurs the video quality filter 236 is conditioned to gradually change the video characteristics of the resulting video signal from those of the normal video signal to those of the robust video signal. At the beginning of that time interval, the selector 238 is conditioned to couple the filtered video signal to the output terminal as the resulting video signal. When that time interval is complete, and the decoded video signal is derived from the robust mode packet stream, the selector 238 is conditioned to couple the decoded video signal to the output terminal as the resulting video signal. Similarly, if a switch from the robust mode video signal to the normal mode video signal occurs, for a time interval of several video pictures after the switch occurs the video quality filter 236 is conditioned to gradually change the video characteristics of the resulting video signal from those of the robust video signal to those of the normal video signal. At the beginning of that time interval, the selector 238 is conditioned to couple the filtered video signal to the output terminal as the resulting video signal. When that time interval is complete, and the decoded video signal is derived from the normal mode packet stream, the selector 238 is conditioned to couple the decoded video signal to the output terminal as the resulting video signal.

Abrupt switching between video signals having different video quality (resolution, frame rate, etc.) may cause artifacts which may be objectionable to a viewer. Because the video quality of the resulting video signal is gradually reduced before switching from the normal mode video signal to the robust mode video signal and gradually increased after switching from the robust mode video signal to the normal mode video signal, objectionable artifacts resulting from the switch are minimized.

Another embodiment of a staggercasting communications system may also provide switching while minimizing objectionable artifacts and does not require any special placement of IDSs in the normal and robust mode packet streams. A receiver 200' is illustrated in FIG. 6. In FIG. 6, elements which are similar to those in the receiver 200 in FIG. 2 are designated by the same reference number and are not described in detail below. In FIG. 6, the first output terminal of the demultiplexer 210 is coupled to the input terminal of the normal mode decoder 240'. A first output terminal of the normal mode decoder 240' is coupled to the first input terminal of the selector 230' and a second output terminal of the normal mode decoder 240' is coupled to a first input terminal of a normal mode frame store 250'. The output terminal of the delay device 220 is coupled to the input terminal of the robust mode decoder 240". A first output terminal of the robust mode decoder 240" is coupled to the second input terminal of the selector 230' and a second output terminal of the robust mode decoder 240" is coupled to a first input terminal of a robust mode frame store 250". The output terminal of the selector 230' is coupled to respective second input terminals of the normal mode frame store 250' and the robust mode frame store 250". An output terminal of the normal mode frame store 250' is coupled to a second input terminal of the normal mode decoder 240' and an output terminal of the robust mode frame store 250" is coupled to a second input terminal of the robust mode decoder 240".

In operation, the delay device 220 introduces the same delay into the robust mode packet stream that the delay device 130 in the transmitter 100 (of FIG. 1) introduces into the normal mode packet stream. Consequently, the packet stream signals at the respective input terminals of the normal mode decoder 240' and the robust mode decoder 240" are time aligned with respect to the content representative signal.

Both the normal and the delayed robust mode packet streams are system and source decoded to produce corresponding content representative signal streams, as described in detail above. In the illustrated embodiment, these content representative signal streams are respective sequences of video pictures. In both normal mode decoding and robust mode decoding, video data representing surrounding pictures are required to decode predictive pictures or slices. The normal mode frame store 250' holds these surrounding pictures for the normal mode decoder 240' and the robust mode frame store 250" holds these surrounding pictures for the robust mode decoder 250".

In the receiver illustrated in FIG. 6, switching is performed on a picture-by-picture basis rather than on an IDS basis. The normal mode decoder 240' decodes normal mode packets into an associated content representative signal containing successive video pictures. Concurrently, the robust mode decoder 240" decodes robust mode packets into an associated content representative signal containing successive video pictures. As described above, the demultiplexer 210 produces an error signal on the error signal line E indicating that the composite signal from the demodulator 207, or at least some portion of it, is unusable. In the embodiment illustrated in FIG. 6, this error signal may be generated by detecting missing packets in the demultiplexed packet streams. Thus, the error signal on the error signal line E indicates not only that a packet is missing but also which packet stream is missing a packet. Because the packets carry in the payload a portion of the data forming a video picture carried by the packet stream, and carry data in the header identifying the packet stream to which this packet belongs, the packet stream which is missing a packet may be marked as erroneous.

A video picture may be successfully received in both the normal and robust mode packet streams; may be successfully received in the normal mode packet stream but erroneously received in the robust mode packet stream; may be erroneously received in the normal packet stream but successfully received in the robust packet stream; or may be erroneously received in both the normal and robust mode packet streams.

Under normal conditions, that is, when no error is detected in either the normal mode nor the robust mode packet streams, both the normal mode decoder 240' and the robust mode decoder 240" successfully decode the corresponding video picture. The selector 230' couples the content representative video picture derived from the normal mode decoder 240' to the output terminal 215. Also, under normal conditions, the normal mode decoder 240' supplies video pictures to the normal mode frame store 250' and the robust mode encoder 240" supplies video pictures to the robust mode frame store 250".

If an error is detected in the robust mode packet stream but no error is detected in the normal mode packet stream, then only the normal mode decoder 240' successfully decodes the corresponding video picture. The selector 230' couples the content representative video picture derived from the normal mode decoder 240' to the output terminal 215. Also, the normal mode decoder 240' supplies the decoded video picture to the normal mode frame store 250'. However, because the robust mode decoder 240" did not successfully decode the corresponding video picture, it doesn't supply any video picture to the robust mode frame store 250". Instead, the successfully decoded video picture from the normal mode decoder 240' is routed from the selector 230' to the robust mode frame store 250".

If an error is detected in the normal mode packet stream but no error is detected in the robust mode packet stream, then only the robust mode decoder 240" successfully decodes the corresponding video picture. The selector 230' couples the content representative video picture derived from the robust mode decoder 240" to the output terminal 215. Also, the robust mode decoder 240" supplies the decoded video picture to the robust mode frame store 250". However, because the normal mode decoder 240' did not successfully decode the corresponding video picture, it doesn't supply any video picture to the normal mode frame store 250'. Instead, the successfully decoded video picture from the robust mode decoder 240" is routed from the selector 230' to the robust mode frame store 250'.

In the above two cases, the video picture stored in the frame store associated with the decoder which did not successfully decode that video picture is the video picture from the other decoder. This may degrade subsequent decoding compared to what it would be if the correct video picture were stored in the frame store. This is especially true should the substituted video picture be of lower quality than the erroneous video picture. However, the accuracy of subsequent decoding is better than if no video picture at all were stored in the frame store.

Should an error be detected in a video picture in both the normal mode and robust mode packet stream then no accurate video picture is decoded and other masking techniques must be performed.

The operation of the receiver 200' illustrated in FIG. 6 may be better understood by reference to FIG. 7. In FIG. 7, a top set of rectangles (MPEG) respectively represent the input 420 and output 520 of the normal mode decoder 240'; a middle set of rectangles (JVT) respectively represent the input 440 and output 540 of the robust mode decoder 240"; and the bottom set of rectangles (OUTPUT) respectively represent the video pictures 460 and their source 560 at the output terminal 215. Referring to the MPEG decoding: the upper set of rectangles 420 represent the source coded video pictures (I, P, and/or B) at the input terminal of the normal mode decoder 240'. The lower set of rectangles 520 represent the resulting video pictures at the output terminal of the normal mode decoder 240'. Similarly, referring to the JVT decoding: the upper set of rectangles 440 represent the source coded IDR picture (which may include a plurality of only I slices) and the following source coded video slices (I, P, B, SI and/or SP) at the input terminal of the robust mode decoder 240". The lower set of rectangles 540 represent the resulting video pictures at the output terminal of the robust mode decoder 240". Referring to the output terminal 215, the upper set of rectangles 460 represent the output video pictures and the lower set of rectangles 560 represent the source of that particular video picture.

More specifically, in the normal mode (MPEG) packet stream, the video pictures 6, 10 and 13 are each missing at least one packet, as indicated by crosshatching. Similarly, in the robust mode (JVT) packet stream, the video pictures 7 and 10 are missing at least one packet, as indicated by the crosshatching. All the other video pictures for both the normal mode and robust mode packet streams include all packets and may be successfully decoded.

For video pictures 0-5, 8, 9, 11, 12 and 14, the selector 230' couples the video pictures derived from the normal mode decoder 240' (MPEG) to the output terminal 215, as indicated by "M" in FIG. 7. In addition, for these video pictures, the video pictures from the normal mode decoder 240' are supplied to the normal mode frame store 250' and the video pictures from the robust mode decoder 240" are supplied to the robust mode frame store 250".

For pictures 6 and 13, the video pictures in the normal mode packet stream are erroneous but the corresponding video pictures in the robust mode packet stream are complete and available. For these pictures, the selector 230' couples the video picture from the robust mode decoder 240" (JVT) to the output terminal 215, as indicated by "J" in FIG. 7. Because for these pictures there is no normal mode video picture, the robust mode video picture from the robust mode decoder 240" is coupled to both the robust mode frame store 250" and the normal mode frame store 250'.

For picture 7, the video picture in the normal mode packet stream is complete but the corresponding video picture in the robust mode packet stream is erroneous. For this picture, the selector 230' couples the video picture from the normal mode decoder 240' to the output terminal 215, as indicated by "M" in FIG. 7. Because for this picture there is no robust mode video picture, the normal mode video picture from the normal mode decoder 240' is coupled to both the normal mode frame store 250' and the robust mode frame store 250".

For picture 10, the video picture in both the normal mode and robust mode packet streams is erroneous. Because there is no valid video picture, some form of error masking may be used. This is indicated by an "XX" in FIG. 7. Because there is no valid video picture from either the normal mode decoder 240' or the robust mode decoder 240", no decoded video picture may be stored in either the normal mode frame store 250' or the robust mode frame store 250". The data stored in the frame stores 250' and 250" may also be derived from some form of error masking.

By decoding both packet streams into streams of video pictures, and switching from one video stream to the other at the beginning of each video picture, video artifacts resulting from failure to properly decode a packet stream may be minimized. Switching with a gradual change of video quality, as illustrated in FIG. 5 may be used in a receiver as illustrated in FIG. 6. However, because in the receiver of FIG. 6 switching occurs at each picture, artifacts from such switching are not as objectionable as when switching occurs at IDS boundaries, as in FIG. 2.

Degraded channel conditions may, however, result in frequent switches between normal mode and robust mode packet streams. This frequent switching may result in artifacts which may be objectionable to a viewer. This is especially true if the video quality of the robust mode video signal is substantially different from that of the normal mode video signal.

In order to minimize artifacts caused by over-frequent switching between the normal mode packet stream and the robust mode packet stream, the selector 230 (of FIG. 2) and 230' (of FIG. 6) is configured to restrict switching at more often than a predetermined frequency. More specifically, the selector 230 or 230' may monitor the frequency at which switching is desired, and compare it to a predetermined threshold. If the frequency of desired switching is over the threshold, then the frequency at which actual switching occurs is restricted to below some maximum frequency. This is a form of switching hysteresis.

For example, assume that the normal mode packet stream carries a video signal of high quality (e.g. high definition (HD)) and the robust mode packet stream carries a video signal of lower quality (e.g. standard definition (SD)). When the normal mode HD packet stream is unavailable, then the robust mode SD packet stream is processed to generate the image. Upscaling an SD video signal for display on an HD display device generates a video image of poor quality. If the normal mode packet stream is fading in and out frequently, but the robust mode packet stream remains available, then frequent switches between the normal mode HD video signal and the robust mode SD video signal occur. Frequent switches between HD and SD packet streams, with frequent switches between high quality and low quality images, produce artifacts which are objectionable to a viewer.

Continuing the example, if the error signal E indicates that switching should occur (i.e. normal mode packets are missing) e.g. more than two times per minute, then actual switching is restricted to minimize the switching artifacts described above. In this example, under these conditions the selector 230 or 230' selects the robust mode packet stream for e.g. at least one minute for every switch. This will decrease the number of switches and, thus, minimize the visible artifacts resulting from those switches. One skilled in the art will understand that this is only one embodiment implementing switching hysteresis. The thresholds for the maximum switching frequency to invoke hysteresis and for the restricted switching frequency may be made different than those of the example. Such thresholds may be determined empirically to find those which minimize objectionable visible artifacts. Further, the thresholds may be dynamically varied during the operation of the receiver. Finally, other hysteresis algorithms may be developed to restrict switching in the presence of conditions which would normally result in excessive switching.

Referring again to FIG. 3 and FIG. 4, at the beginning of any broadcast or channel change, there is a period designated $T_{adv}$ during which the normal mode packets (310, 410) are filling the delay device 220 (of FIG. 2 and FIG. 6). In the receivers illustrated in FIG. 2 and FIG. 6, only after the delay circuit 220 is full does the receiver begin operation. However, this causes undue delay when a receiver is switched on or a channel is changed. During the time interval $T_{adv}$, however, the robust mode packet stream (300, 400) is immediately available.

In FIG. 2, the undelayed robust mode packet stream is coupled directly from the demultiplexer 210 to a third input terminal of the selector 230, as illustrated in phantom. When the receiver is powered on or a new channel is selected, the selector 230 couples the undelayed robust mode packet stream to the multi-standard decoder 240. The multi-standard decoder 240 is conditioned to depacketize and decode the robust mode packets, as described in detail above, and a video signal is made immediately available to the utilization circuitry at output terminal 215. When the normal mode packet stream becomes available, then the selector 230 will couple the normal mode packet stream signal to the multi-standard decoder 240.

In FIG. 6, the undelayed robust mode packet stream is coupled directly from the demultiplexer 210 to the robust mode decoder 240". When the receiver is powered on or a new channel is selected, the robust mode decoder 240" is conditioned to depacketize and decode the robust mode packet stream from the demultiplexer 210 and generate a robust mode video signal, as described in more detail above. The selector 230' is conditioned to couple the robust mode video signal from the robust mode decoder 240" to the utilization circuitry via the output terminal 215. When the normal mode packet stream becomes available, then the normal mode decode 240' depacketizes and decodes it and produces a normal mode video signal. The selector 230' is conditioned to couple the normal mode video signal to the utilization circuitry via the output terminal 215.

In either case, data in the normal mode and robust mode packet streams are analyzed to determine when the normal mode packet stream has become available and normal operation of the receiver may be commenced. In accordance with known MPEG 2 system (transport packet) encoding, information related to the system time clock (STC) in the transmitter is placed in the encoded packet streams via program clock reference (PCR) data. Further information, termed a presentation time stamp (PTS), which indicates when a portion (termed an access unit) of a packet stream must be decoded, is included at least at the beginning of each such access unit. When the normal mode and robust mode packet streams are depacketized and decoded by the multi-standard decoder 240 (FIG. 2) or the normal mode decoder 240' and the robust mode decoder 240" (FIG. 6), the system time clock (STC) in the receiver is synchronized to that in the transmitter through the PCR data. When the value of the PTS in the normal mode packet stream is equal to the value of the receiver STC, this indicates that the normal mode packet stream is in synchronism with the robust mode packet stream, and the receiver may begin normal operation by decoding the normal mode packet stream, as described above.

Because many content representative signals may be transmitted on one multiplexed transport packet stream, a known means for supplying information about the different packet streams has been developed. Each packet stream is identified by a packet identifier (PID), which is included in the header of each packet in that packet stream. One packet stream, having a predetermined known PID, contains one or more data tables containing identification and other information about all the other packet streams. This known table structure may be used to carry information about robust mode packet streams which are not related to any other normal mode packet stream. However, additional information must be sent from the transmitter to the receivers about robust packet streams which are related to other normal mode packet streams.

An extended syntax and semantics for these existing tables may carry the necessary data. FIG. 8 is a table which illustrates an extended syntax and semantics for the program map table (PMT) and/or program and information systems protocol—virtual channel table (PSIP-VCT). Each row in FIG. 8 represents either a data item in the extended table, or a meta-syntactical description in pseudo-code form. The first column is either a name of a data item or a meta-syntactical specification. The second column is a description of the data item or syntactical specification. The third column is an indication of the size of any data item.

The first item 802 in the extended syntax is the number of robust packet streams used to staggercast other normal mode packet streams. Then information for each such staggercast robust mode packet stream is included in the table, as indicated by the meta-syntactic specification in the next row and the last row of the table. Some such information is required for every robust mode packet stream. For example, data 804 represents the program identifier (PID) for the robust mode packet stream; data 806 represents the type of data being carried by that packet stream; data 808 represents the PID of the normal mode packet stream associated with this packet stream; and data 810 represents the delay being introduced into the normal mode packet stream by the delay device 130 in the transmitter 100 (of FIG. 1).

Some such information, however, relates to robust mode packet streams only of a particular data type. For example, if the robust mode packet stream carries video data, then information 812 related to the compression format, frame rate, interlace format, horizontal and vertical resolution, and bit rate is sent from the transmitter to the receivers so that the video image represented by the robust mode packet stream may be properly decoded and displayed. Similarly, if the robust mode packet stream carries audio data, the information 814 related to the compression format, bit rate, sample rate; and audio mode (surround, stereo, or mono) is sent from the transmitter to the receivers so that the sound represented by the robust mode packet stream may be properly decoded and reproduced.

One other piece of data relates to the relative quality of the content representative signal carried by the robust mode packet stream. As described above, the quality of the content representative signal carried by the robust mode packet stream may be different from that of the normal mode packet stream with which it is associated. In the examples described above, the quality of content representative signal carried by the robust mode packet is specified to be lower than that of the associated normal mode packet stream. However, under some conditions, the provider may transmit a higher quality signal on the robust mode packet stream. In this condition, it is preferred that receivers use the content representative signal carried by the robust mode packet stream instead of the associated normal mode packet stream. This is indicated to the receivers by the data 816.

By providing information associating robust mode packet streams to normal mode packet streams, a receiver 200 (of FIG. 2) or 200' (of FIG. 6) may find both the normal mode and robust mode packet streams in the multiplexed packet stream, and concurrently process both of them as described above. Prior receivers which do not include the capabilities of the receivers of FIG. 2 and FIG. 6 will ignore this information and process the normal mode packet stream in the known manner. As described above, the delay introduced between the robust mode packet stream and the associated normal mode packet stream by the delay device 130 in the transmitter 100 (of FIG. 1) is transmitted as the data 810 in the table illustrated in FIG. 8. This permits the transmitter to change the delay period and permits the receiver to adjust its delay period accordingly. For example, under some channel conditions fading may be more likely than others, or the characteristics of the fading may change (i.e. the fades may be longer). Under such conditions, the delay period may be increased. The length of the delay is transmitted to the receivers, which will adapt the delay devices 220 (in FIG. 2 and FIG. 6) to the same delay period. Other conditions may also require differing delay periods.

The staggercasting concept described above may be expanded. Multiple versions of the same content representative signal, encoded into video signals having different video quality (e.g. resolution, frame rate, etc.), may be staggercasted. FIG. 9 is a block diagram of a portion of another embodiment of a staggercasting transmitter for transmitting multiple versions of a content representative signal. In FIG. 9 those elements which are the same as those in the transmitter illustrated in FIG. 1 are designated by the same reference number and are not described in detail below. FIG. 10 is a block diagram of a portion of a corresponding embodiment of a staggercasting receiver. In FIG. 10, those elements which are the same as those in the receiver illustrated in FIG. 2 are designated by the same reference number and are not described in detail below.

In FIG. 9a, input terminal 105 is coupled to an input terminal of a hierarchical encoder 160. Hierarchical encoder 160 source encodes and packetizes a plurality of output packet stream signals. A first one (0) of the plurality of output packet stream signals is coupled to a corresponding input terminal of the multiplexer 140'. The remainder of the plurality of output packet stream signals, (1) to (n) are coupled to respective input terminals of a corresponding plurality of delay devices 130(1) to 130(n). The delay period introduced by the delay device 130(2) is greater than that introduced by delay device 130(1); the delay period introduced by the delay device 130(3) (not shown) is greater than that introduced by delay device 130(2); and so forth. The delays may be specified in terms of packets, as illustrated in FIG. 3; independent decoding segments, as illustrated in FIG. 4; or video picture periods, as illustrated in FIG. 7. Respective output terminals of the plurality of delay devices 130(1) to 130(n) are coupled to corresponding input terminals of the multiplexer 140'.

In operation, the first packet stream signal (0) carries a base video signal source encoded at a lowest video quality. The second packet stream signal (1) carries extra video information. This extra video information, when combined with the base video signal (0) produces a video signal with a higher video quality than that of the base video signal (0) alone. The third packet stream signal (2) carries further extra video information. The video information in this signal, when combined with the base video signal (0) and the video information in the second packet stream signal (1) produces a video signal with a higher video quality than that of the combination of the base signal (0) and the second signal (1). The video information in the additional packet stream signals, up to packet stream signal (n) from the hierarchical encoder 160, may be combined to produce video signals of higher video quality. The multiplexed signal is channel encoded (modulated) and supplied to receivers via output terminal 115.

FIG. 10a is the receiver corresponding to the transmitter illustrated in FIG. 9a. The demultiplexer 210 extracts a plurality (0) to (n) of packet streams. Packet stream (n) is coupled to a corresponding input terminal of a hierarchical decoder 260. The remainder (0) to (n-1) (not shown) of the plurality of packet streams are coupled to respective input terminals of a corresponding plurality 220 of delay devices. The plurality 220 of delay devices are conditioned to realign all of the plurality (0) to (n) of packet streams in time at the input terminals of the hierarchical decoder 260. The error signal on signal line E from the demultiplexer 210 is coupled to a control input terminal of the hierarchical decoder 260. An output terminal of the hierarchical decoder 260 is coupled to the output terminal 215.

In operation, the demodulator 207 channel decodes (demodulates) the received signal as appropriate, as described in more detail above. The multiplexer 210 extracts the plurality, (0) to (n), of packet streams carrying the hierarchy of video information corresponding to the packet streams (0) to (n) illustrated in FIG. 9a. These packet streams are aligned in time by the plurality 220 of delay devices. The error signal from the demultiplexer 210 indicates which packet streams are unavailable, e.g. missing packets. The plurality of packet streams are depacketized and the highest quality video image which may be hierarchically decoded from the available packet streams is produced by the hierarchical decoder 260. That is, if a fading event has made all but the packet stream (0) carrying the base video signal unavailable, then the hierarchical decoder 260 depacketizes and decodes only the packet stream (0). If the packet stream (1) is also available, then the hierarchical decoder 260 depacketizes and decodes both the packet stream (0) and the packet stream (1) and generates a video signal of higher quality, and so forth. If all packet streams (0) to (n) are available, then the hierarchical decoder 260 depacketizes and decodes them all and generates a video signal of the highest video quality.

In FIG. 9b, the input terminal 105 is coupled to respective input terminals of a plurality 170 of video encoders. The output terminal of a first one 170(0) of the plurality 170 of video encoders is coupled to a corresponding input terminal of the multiplexer 140'. The output terminals of the remainder, 170(1) to 170(n), of the plurality 170 of video encoders are coupled to respective input terminals of a plurality of delay devices 130(1) to 130(n). The delay period introduced by the delay device 130(2) is greater than that introduced by delay device 130(1); the delay period introduced by the delay device 130(3) (not shown) is greater than that introduced by delay device 130(2); and so forth. The delays may be specified in terms of packets, as illustrated in FIG. 3; independent decoder segments, as illustrated in FIG. 4; or video frame periods, as illustrated in FIG. 7. Respective output terminals of the plurality of delay devices are coupled to corresponding input terminals of the multiplexer 140'.

In operation, the first encoder 170(0) source encodes the content representative signal and system encodes (packetizes) the resulting source encoded signal to generate a packet stream carrying information representing a video signal at lowest quality: in the illustrated embodiment, a quarter-common-interface-format (QCIF) video signal. The second encoder 170(1) similarly generates a packet stream carrying information representing a video signal at a higher quality than that produced by the first encoder 170(0): in the illustrated embodiment, a common-interface-format (CIF) video signal. Other video encoders, not shown, similarly generate packet streams carrying video signals at successively higher video quality. An SD video encoder 170(n-1) similarly generates a packet stream carrying an SD quality video signal and an HD video encoder 170(n) similarly generates a packet stream carrying an HD quality video signal. These packet streams are multiplexed by the multiplexer 140' then channel encoded (modulated) and transmitted to the receivers via the output terminal 115.

FIG. 10b is the receiver corresponding to the transmitter illustrated in FIG. 9b. In FIG. 10b, the demultiplexer 210 extracts a plurality (0) to (n) of packet streams. The packet stream (n) is coupled to an input terminal of a HD decoder 270(n). The remainder of the packet streams (0) to (n-1) are coupled to respective input terminals of a plurality 220 of delay devices. Respective output terminals of the plurality 220 of delay devices are coupled to corresponding input terminals of a plurality 270 of video decoders. Respective output terminals of the plurality 270 of video decoders are coupled to corresponding input terminals of a selector. The error signal on the error signal line E from the demultiplexer 210 is coupled to a control input terminal of the selector 280.

In operation, the demodulator 207 channel decodes (demodulates) the received composite signal as appropriate, as described in more detail above. The demultiplexer 210 extracts the packet streams (0) to (n) corresponding to those generated by the plurality 170 of video encoders illustrated in FIG. 9b. The plurality 220 of delay devices realigns all these packet streams (0) to (n) in time at the respective input terminals of the plurality 270 of video decoders. Each packet stream is coupled to the video decoder appropriate for decoding the video signal carried by that packet stream. For example, the packet stream carrying the QCIF quality video signal is coupled to the QCIF decoder 270(0); the packet stream carrying the CIF quality video signal is coupled to the CIF decoder 270(1) and so forth. Each video decoder in the plurality 270 of video decoders depacketizes and source decodes the signal supplied to it to generate a video signal. The error signal E from the demultiplexer 210 indicates which of the packet streams (0) to (n) is unavailable due to errors (e.g. missing packets). The selector 280 is conditioned to couple the highest quality video signal produced from available packet streams to the output terminal 215.

One skilled in the art will understand that image scaling may be required for some of the lower quality video image signals in the transmitter systems illustrated in FIG. 9. The encoders, either the hierarchical encoder 160 of FIG. 9a or the plurality 170 of encoders of FIG. 9b, include any such image scaling circuitry which is necessary it is not shown to simply the figure.

For the communications system illustrated in FIG. 9 and FIG. 10, any of the packet streams produced by the hierarchical encoder 160 (of FIG. 9a) or any of the plurality 170 of video encoders (of FIG. 9) may be source encoded according to the robust source encoding scheme (JVT) and channel encoded (modulated) by the robust modulation scheme (4-VSB and/or 2-VSB), as described in more detail above. The corresponding demodulation and decoding of that packet stream takes place in the receiver of FIG. 10. Also, the lowest quality video signal is advanced the most, and consequently has the highest fade resistance. Further, the lowest video quality signal may be encoded with the least number of bits and thus takes a small amount of time to transmit. As the video quality of the video signal carried by packet streams increases, the time by which that packet stream is advanced decreases, consequently the fade resistance decreases. Thus, when the channel characteristic has no fades, then the packet stream(s) carrying the highest video quality signal remain(s) available. Mild fades leave packet stream(s) carrying lower video quality signals available, and severe fades leave only the packet stream carrying the lowest quality video signal available. This gradual reduction in video quality as channel characteristics degrade is a desirable characteristic for a viewer.

As described above, and illustrated in FIG. 1 and FIG. 9b, the same content representative signal may be staggercasted as a packet stream carrying a high quality video signal and as one or more packet streams carrying reduced video quality video signals. In such a communications system, it is, therefore, possible for some receivers, for example, a television receiver in a cellular phone or personal digital assistant (PDA), to extract and decode only a reduced quality content representative signal. In such a receiver, the display device is lower resolution and may only be able to display a reduced quality video signal. Further, the use of battery power makes it advantageous to minimize the amount of data processed. Both of these considerations suggest that such receivers decode only the packet stream carrying a video signal of appropriate video quality and display that image.

FIG. 10c illustrates a receiver. In FIG. 10c, the input terminal 205 is coupled to the input terminal of the demodulator 207. An output terminal of the demodulator 207 is coupled to the input terminal of the demultiplexer 210. An output terminal of the demultiplexer 210 is coupled to an input terminal of a decoder 270. An output terminal of the decoder is coupled to the output terminal 215.

In operation, the demodulator 207 demodulates the received composite signal in the appropriate manner, as described in more detail above. The demultiplexer 210 selects only a single packet stream having a video signal of the desired quality. For example, this may be a QCIF format video signal, such as produced by the QCIF encoder 170(0) of FIG. 9b and carried on packet stream (0). The packet stream (0) is extracted by the demultiplexer 210 and is decoded by the decoder 270 to produce the QCIF format video signal. Such a receiver need only receive the table illustrated in FIG. 8 to determine the PID of the desired lower quality video signal packet stream (0). From the resolution data 812 transmitted in the table, the mobile receiver is able to select the packet stream carrying the reduced quality video signal desired for processing.

The communications system illustrated in FIG. 9 and FIG. 10 may be further extended. In the systems described above, video information carried in additional packet streams, may be used to provide graceful degradation under worsening channel conditions. However, such systems may also transmit additional video information which can enhance the quality of video signals under good channel conditions. By including a packet stream carrying augmented video information, in addition to the packet stream carrying the normal video signal, an augmented video image may be transmitted.

FIG. 11 is a block diagram of a portion of a transmitter for transmitting a dual interlaced video signal and FIG. 12 is a block diagram of a portion of a receiver for receiving a dual interlaced video signal. FIG. 13 is a display diagram useful in understanding the operation of the dual interlace transmitter illustrated in FIG. 11 and the dual interlace receiver illustrated in FIG. 12. In FIG. 11, those elements which are the same as those illustrated in FIG. 1 are designated by the same reference number and are not described in detail below. In FIG. 12, those elements which are the same as those illustrated in FIG. 6 are designated by the same reference number and are not described in detail below.

Referring to FIG. 13, a content source produces a progressive scan video display, illustrated schematically at the top of FIG. 13 as a sequence of video lines 1310 within a display border 1320. A normal HD video image picture includes 1080 lines. Such an HD video image is transmitted at a rate of 30 frames per second in interlaced format. That is, an interlacer generates two fields: a first field including only odd numbered lines and a second field including only even numbered lines. These fields are transmitted successively at a rate of 60 fields per second.

In FIG. 11, the input terminal 105 is coupled to a dual output interlacer 102. A first output terminal of the dual output interlacer 102 is coupled to the input terminal of the robust mode encoder 110. A second output terminal of the dual output interlacer 102 is coupled to the input terminal of the normal mode encoder 120.

Referring again to FIG. 13, the frame display image 1330(A) corresponds to the video signal A produced at the first output terminal of the dual output interlacer 102 and the frame display image 1330(B) corresponds to the video signal B produced at the second output terminal of the dual output interlacer 102. In the frame display images 1330(A) and 1330(B), solid lines are transmitted in one field, and dotted lines are transmitted in the following field. In the frame display image in 1330(A) solid lines are odd lines and dotted lines are even lines; and in the frame display image 1330(B), solid lines are even lines and dotted lines are odd lines. This is illustrated in more detail in the field display images 1340(A), 1340(B), 1350(A) and 1350(B) beneath the frame display images 1330 (A) and 1330(B). In field 1, video signal A transmits the odd lines as illustrated in field display image 1340(A), and video signal B transmits the even lines, as illustrated in field display image 1340(B). In field 2, the video signal A transmits the even lines as illustrated in field display image 1350(B) and the video signal B transmits the odd lines as illustrated in field display image 1350(B).

As described in more detail above, the video signal A is source encoded using JVT source encoding, then system encoded (packetized) by the robust mode encoder 110. The video signal B is source encoded using MPEG 2 source encoding, then system encoded (packetized) by the normal mode encoder. The modulator channel encodes (modulates) the robust mode packet stream using 4-VSB and/or 2-VSB modulation, and modulates the normal mode packet stream using 8-VSB modulation.

In FIG. 12, a first output terminal of the demultiplexer 210 is coupled to the input terminal of the normal mode decoder 240' and a second output terminal of the demultiplexer 210 is coupled to the input terminal of the delay device 220. The output terminal of the normal mode decoder 240' is coupled to a first signal input terminal of a dual input deinterlacer 202 and the output terminal of the robust mode decoder 240" is coupled to a second signal input terminal of the dual input deinterlacer 202. The error signal from the demultiplexer 210 is coupled to a control input terminal of the dual input deinterlacer 202. An output terminal of the dual input deinterlacer 202 is coupled to the output terminal 215.

As described in more detail above, the demodulator 207 channel decodes (demodulates) the robust mode packet stream using 4-VSB and/or 2-VSB demodulation and demodulates the normal mode packet stream using 8-VSB demodulation. The normal mode decoder 240' system decodes (depacketizes) and source decodes the normal mode packet stream using JVT decoding to reproduce the video signal B. The robust mode decoder 240" depacketizes and source decodes the robust mode packet stream using MPEG 2 decoding to reproduce the video signal A.

The dual input deinterlacer 202 operates to combine the interlaced scan lines of the video signal A from the robust mode decoder 240" with the interlaced scan lines of the video signal B from the normal mode decoder 240' to produce a progressive scan field. For field 1, the odd scan lines from video signal A, illustrated in field display image 1340(A), are combined with the even scan lines from video signal B, illustrated in field display image 1340(B). The resulting progressive scan field is illustrated in the field display image 1345. For field 2, the even scan lines from video signal A, illustrated in field display image 1350(A), are combined with the odd scan lines from video signal B, illustrated in field display image 1350(B). The resulting progressive scan field is illustrated in the field display image 1355. Thus, a progressive scan field may be produced at the output terminal of the dual input deinterlacer 202 each field period. For an HD signal, this means that a full 1080 line image is produced 60 times per second.

The dual interlaced technique described above and illustrated in FIG. 11, FIG. 12 and FIG. 13 may also be combined with the techniques described above to provide a wider range of graceful degradation in the event channel conditions degrade. If channel conditions render one of the packet streams carrying video signals A or B unavailable, then the error signal E indicates this to the dual input deinterlacer 202. The dual input deinterlacer 202 begins producing the standard HD interlaced video signal from the available video signal. The display device (not shown), is reconfigured to display the image represented by the standard interlaced video signal until the other video signal becomes available again. If neither of the HD video signals are available, then the highest quality available video signal may be displayed, as described in detail above with reference to the transmitter in FIG. 9 and the receiver in FIG. 10.

The same technique may also be used to convert any interlaced format video signal, for example an SD video signal, to a progressive scan video signal at twice the frame rate. It is not necessary for the two video signals A and B to be staggercasted, as illustrated in FIG. 11 and FIG. 12. It is only necessary that they be simulcasted. However, staggercasting additionally provides graceful degradation in the presence of fade events, as described above.

The communications system described above may be further extended to cooperate with a recording device, such as a digital personal video recorder (PVR). Such PVR devices are becoming included in digital television receivers due to the decreasing costs of such a device. In FIG. 9*b*, a PVR device 295 includes a video terminal (Vid) bidirectionally coupled to the selector 280, and a control terminal (Ctl) also bidirectionally coupled to the selector 280, as illustrated in phantom. The selector 280 is also coupled to a source of user control, also as illustrated in phantom.

The selector 280 is configured to couple any desired video signal from the plurality 270 of video detectors to the PVR 295 independently of the input video signal coupled to the output terminal 215. The selector 280 may also be configured to couple an input video signal from the PVR 295 to the output terminal 215 for playback. The selector 280 may also supply control data to the PVR 295, and the PVR 295 supply status data to the selector 280 over the bidirectional control terminal.

The PVR 295 may be controlled in several modes of operation. In one mode of operation, the best available video signal is coupled to the PVR 295 for recording. In this operational mode, the selector 280 couples the same input video signal to the PVR 295 as is coupled to the output terminal 215. This will result in the best quality video signal being recorded, but will take the most storage space, in the PVR 295. This will take advantage of the normal mode and robust mode packet streams carrying the video signal and the graceful degradation that provides. Alternatively, a lower resolution video signal may be coupled to the PVR 295 than is coupled to the output terminal 215. For example, while the selector 280 may couple the best available video signal to the output terminal 215, the selector 280 may couple a video decoder 270 producing a lesser quality video signal to the PVR 295. This lesser quality video signal may be a selected one of the available video signals, such as the SD quality video signal from the SD decoder 270(*n*-1), with graceful degradation supplied by the lesser quality video decoders. Such a signal will require less storage space in the PVR 295 than the best available video signal. This will help to conserve storage space in the PVR 295, and allow for longer recording times. In the event that the selected lower quality video signal becomes unavailable, a higher quality signal may be recorded until the lower quality signal becomes available again. The selection of which lesser quality video to record (i.e. SD, or CIF or QCIF) may be directly selected by a viewer via the user input terminal. Alternatively, the selector 280 may automatically control this selection according to some criterion. For example, a status signal from the PVR 295 can indicate the amount of storage remaining in the PVR 295. As the amount of storage remaining drops, the selector 280 may automatically couple a video decoder 270 having reduced video quality to the PVR 295. Other criteria may be derived and used to control which video signal is coupled to the PVR 295 by the selector 280.

Similarly, a user may desire to control the selection and display of the television programs being broadcast by a transmitter. In existing broadcasting systems, one of the transmitted packet streams carries a user program guide, containing information about all programs currently being broadcast and those due to be broadcast in the near future. From the program guide data, an image of a table listing all such programs, their channels and times may be generated by an on-screen display generator (OSD) 282 as illustrated in FIG. 10*b*. A user may control the display of the program guide information as an aid in finding a desired program and selecting that program to view using a user interface. The user interface displays images to present information to a viewer, requests input from a viewer and accepts viewer input from controls which may be incorporated in the receiver or in a remote control. Existing systems allow a viewer to request additional information about a program listing, such as a more detailed description of the program, a rating (G, PG, R, etc.), time duration, time remaining and so forth.

Additional information related to the staggercasting system described above may be added to the displayed program table, or the additional-information display. This information may be derived from the PSIP-VCT/PMT tables illustrated in FIG. 8. For example, additional indicators may be added to the displayed program table and/or additional-information display indicating that: this program is being staggercasted; what the video quality is of the video signals being staggercasted; what the audio quality of the audio signals being staggercasted; and so forth. By displaying this information for a viewer, the viewer is able to base selection of a program on it. More specifically, a viewer may select a program that is being staggercasted; or may select a program having video signal of a desired video quality, e.g. to match the display device to which the signal is being supplied.

Current receivers also allow a viewer to set certain parameters. For example, a user may wish to automatically view all transmitted channels, or only channels to which the viewer is subscribed, or the subscribed channels plus pay-per-view channels, and so forth without having to manually change the on-screen-display each time it is displayed. A user interface presents a user with a screen image, via the OSD 282, on which this selection may be made using the user controls. An additional screen image may be produced, or an existing screen image modified, on which a viewer sets choices about selection and display of video signals which have been staggercasted, as described above. For example, a viewer may select to have the program table display only staggercasted programs, or to display staggercasted programs carrying video signals at or above a minimum video quality.

The invention claimed is:

1. A method for storing staggercasted content, comprising the steps of:

encoding a set of signals representing content, the set capable of being decoded to produce a corresponding set of decoded signals, each decoded signal having a quality different from the qualities of the decoded signals corresponding to the other encoded signals;

generating a composite signal comprising the set of encoded signals staggered in time;

extracting the set of encoded signals from the composite signal;

detecting errors in the set of extracted encoded signals to produce a subset of available extracted encoded signals which are not erroneous;

decoding a content representative signal at a selectable desired quality; and storing the decoded content representative signal in a storage device;

wherein the step of generating a composite signal comprises the step of further including a signal carrying information about the respective qualities of the encoded set of signals; and wherein the decoding step comprises the step of selecting the content representative signal at the desired quality automatically; and wherein the step of selecting the desired quality automatically comprises the step of selecting the desired quality in response to the status of the storage device.

2. The method of claim 1 wherein if a content representative signal at the desired quality is not available, decoding a content representative signal at a selectable desired quality from the subset of available extracted encoded signals and storing the decoded content representative signal.

3. The method of claim 1 wherein the step of selecting the desired quality automatically comprises the step of selecting the desired quality in response to preset selection parameters.

4. The method of claim 3 wherein the parameters are preset in response to user input.

5. The method of claim 1 wherein if the status of the storage device indicates that the storage device is nearly full, the desired quality is automatically a lower quality.

6. The method of claim 1 wherein the information carrying signal carries data representing either or both of a program map table (PMT) and a program and information systems protocol-virtual channel table (PSIP-VCT).

7. The method of claim 1 wherein the composite signal generating step comprises generating the set of encoded signals such that a lowest quality decoded signal is undelayed, and the other encoded signals are delayed with respect to the encoded signal corresponding to the lowest quality decoded signal such that the higher the quality of the corresponding decoded signal, the longer the delay period.

8. The method of claim 1 wherein the encoding step comprises the step of encoding at least one of the set of encoded signals using a technique which is robust relative to the encoding of the other encoded signals.

9. The method of claim 8 wherein the at least one robust encoded signal comprises the encoded signal corresponding to the lowest quality decoded signal.

10. The method of claim 8 wherein the set of encoded signals are channel encoded, and the robust encoded signals are channel encoded using a channel coding technique robust relative to the channel coding technique used for the non-robust encoded signals.

11. The method of claim 10 wherein the channel coding for the robust encoded signals is one of 4-VSB or 2-VSB modulation and the channel coding for the non-robust encoded signals is 8-VSB modulation.

12. A staggercasting receiver, for receiving a composite signal comprising a set of encoded signals, staggered in time, representing content, the set capable of being decoded to produce a corresponding set of decoded signals, each decoded signal having a quality different from the qualities of the decoded signals corresponding to the other encoded signals, the receiver comprising:
a demultiplexer, responsive to the composite signal, for extracting the set of encoded signals, detecting errors in respective encoded signals, and producing a subset of available extracted signals which are not erroneous;
a decoder, coupled to the demultiplexer and responsive to the error representative signal, for reproducing a content representative signal at a selectable desired quality; and
a storage device, coupled to the decoder, for storing the reproduced content representative signal;

wherein the composite signal further includes a signal carrying information about the respective qualities of the encoded set of signals; and wherein the storage device generates a signal representing the status of the storage device; and the decoder comprises circuitry for automatically reproducing the content representative signal at the desired quality in response to the status representative signal.

13. The receiver of claim 12 wherein the decoder comprises circuitry for reproducing a content representative signal at a selectable desired quality from the subset of available extracted encoded signals if a content representative signal at the desired quality is not available.

14. The receiver of claim 13 wherein the decoder further comprises circuitry for storing preset selection parameters, and for automatically reproducing the content representative signal at the desired quality in response to the selection parameters.

15. The receiver of claim 12 wherein the decoder automatically reproduces the content representative signal at a lower quality in response to the status representative signal indicating that the storage device is nearly full.

16. The receiver of claim 14 wherein further comprises circuitry for storing selection parameters in response to user input.

17. The receiver of claim 12 wherein the information carrying signal carries data representing either or both of a program map table (PMT) and a program and information systems protocol-virtual channel table (PSIP-VCT).

18. The receiver of claim 12 wherein at least one of the set of encoded signals is encoded using a technique which is robust relative to the encoding of the other signals, and the decoder comprises a decoder, responsive to the at least one encoded signal, for decoding the at least one encoded signal.

19. The receiver of claim 18 wherein the at least one robust encoded signal comprises the encoded signal corresponding to the lowest quality decoded signal.

20. The receiver of claim 19 wherein:
the set of encoded signals are channel coded, and the robust encoded signals are channel encoded using one of 4-VSB or 2-VSB modulation and the other encoded signals are channel encoded using 8-VSB modulation; and
the decoder comprises a demodulator for channel decoding the robust encoded signals using one of 4-VSB or 2-VSB demodulation and channel decoding the other encoded signals using 8-VSB demodulation.

21. The receiver of claim 12 wherein
the composite signal comprises the set of encoded signals such that a lowest quality decoded signal is undelayed, and the other encoded signals are delayed with respect to the encoded signal corresponding to the lowest quality decoded signal such that the higher the quality of the corresponding decoded signal, the longer the delay period; and
the receiver further comprising a plurality of delay circuits, coupled between the demultiplexer and the decoder and respectively responsive to the set of extracted encoded signals, for realigning the extracted encoded signals in time.

* * * * *